United States Patent
Chen et al.

(10) Patent No.: US 9,591,590 B2
(45) Date of Patent: Mar. 7, 2017

(54) APPARATUS AND METHOD FOR INTER CELL INTERFERENCE COORDINATION

(71) Applicant: Telefonaktiebolaget L M Ericsson (publ), Stockholm (SE)

(72) Inventors: Tsao-Tsen Chen, Täby (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 14/385,557

(22) PCT Filed: Jul. 16, 2014

(86) PCT No.: PCT/SE2014/050896
§ 371 (c)(1),
(2) Date: Sep. 16, 2014

(87) PCT Pub. No.: WO2016/010465
PCT Pub. Date: Jan. 21, 2016

(65) Prior Publication Data
US 2016/0262114 A1    Sep. 8, 2016

(51) Int. Cl.
*H04B 7/00*     (2006.01)
*H04W 52/24*    (2009.01)
(Continued)

(52) U.S. Cl.
CPC ......... *H04W 52/244* (2013.01); *H04W 52/14* (2013.01); *H04W 52/143* (2013.01);
(Continued)

(58) Field of Classification Search
USPC ..... 455/522, 69–70, 63.1, 67.11, 67.13, 443, 455/444; 370/310–320
See application file for complete search history.

(56) References Cited

U.S. PATENT DOCUMENTS 9,264,204 B2 * 2/2016 Seo ............. H04J 11/0056
2013/0244709 A1 * 9/2013 Davydov .......... H04W 52/243
455/501
(Continued)

FOREIGN PATENT DOCUMENTS

| CA | 2847823 A1 | 4/2013 |
| WO | 2013109110 A1 | 7/2013 |

(Continued)

OTHER PUBLICATIONS

3GPP, "3rd Generation Partnership Project; Technical Specification Group Radio Access Network; Coordinated multi-point operation for LTE physical layer aspects (Release 11)", 3GPP TR 36.819 V11.2.0, Sep. 2013, 1-70.

(Continued)

*Primary Examiner* — Fayyaz Alam
(74) *Attorney, Agent, or Firm* — Murphy, Bilak & Homiller, PLLC

(57) ABSTRACT

A method for performing inter cell interference coordination between a first cell A and a second cell B of a communication network, wherein at least the first cell comprises a plurality of distributed transmission points. The method in the first cell comprises individually controlling the transmit power of the plurality of distributed transmission points within the first cell A. By being able to individually control the transmit power of each distributed transmission point to perform inter cell interference coordination, this has the advantage of improving the performance of victim UEs in the second cell B, while not impacting the performance in most UEs connected to the first cell A (e.g. the aggressor cell).

29 Claims, 15 Drawing Sheets

(51) Int. Cl.
*H04W 52/14* (2009.01)
*H04W 52/42* (2009.01)
*H04W 24/10* (2009.01)
*H04J 11/00* (2006.01)

(52) U.S. Cl.
CPC ......... *H04W 52/24* (2013.01); *H04W 52/241* (2013.01); *H04W 52/247* (2013.01); *H04W 52/42* (2013.01); *H04J 11/0053* (2013.01); *H04W 24/10* (2013.01); *Y02B 60/50* (2013.01)

(56) References Cited

U.S. PATENT DOCUMENTS

| | | | |
|---|---|---|---|
| 2014/0056200 A1* | 2/2014 | Koc | H04W 52/243 370/311 |
| 2014/0148181 A1* | 5/2014 | Lee | H04W 72/085 455/452.1 |
| 2014/0185528 A1 | 7/2014 | Shimezawa et al. | |
| 2014/0211734 A1* | 7/2014 | Seo | H04J 11/0056 370/329 |
| 2015/0003271 A1* | 1/2015 | Park | H04L 27/2613 370/252 |
| 2015/0156656 A1* | 6/2015 | Raghavan | H04W 24/08 370/252 |
| 2015/0349937 A1* | 12/2015 | Kim | H04W 24/08 370/252 |
| 2016/0028448 A1* | 1/2016 | Park | H04B 7/26 375/267 |
| 2016/0036571 A1* | 2/2016 | Park | H04B 7/024 370/330 |

FOREIGN PATENT DOCUMENTS

| | | |
|---|---|---|
| WO | 2013137194 A1 | 9/2013 |
| WO | 2013138792 A1 | 9/2013 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.5.0, Dec. 2013, 1-120.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 1-176.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.2.0, Sep. 2012, 1-136.

* cited by examiner

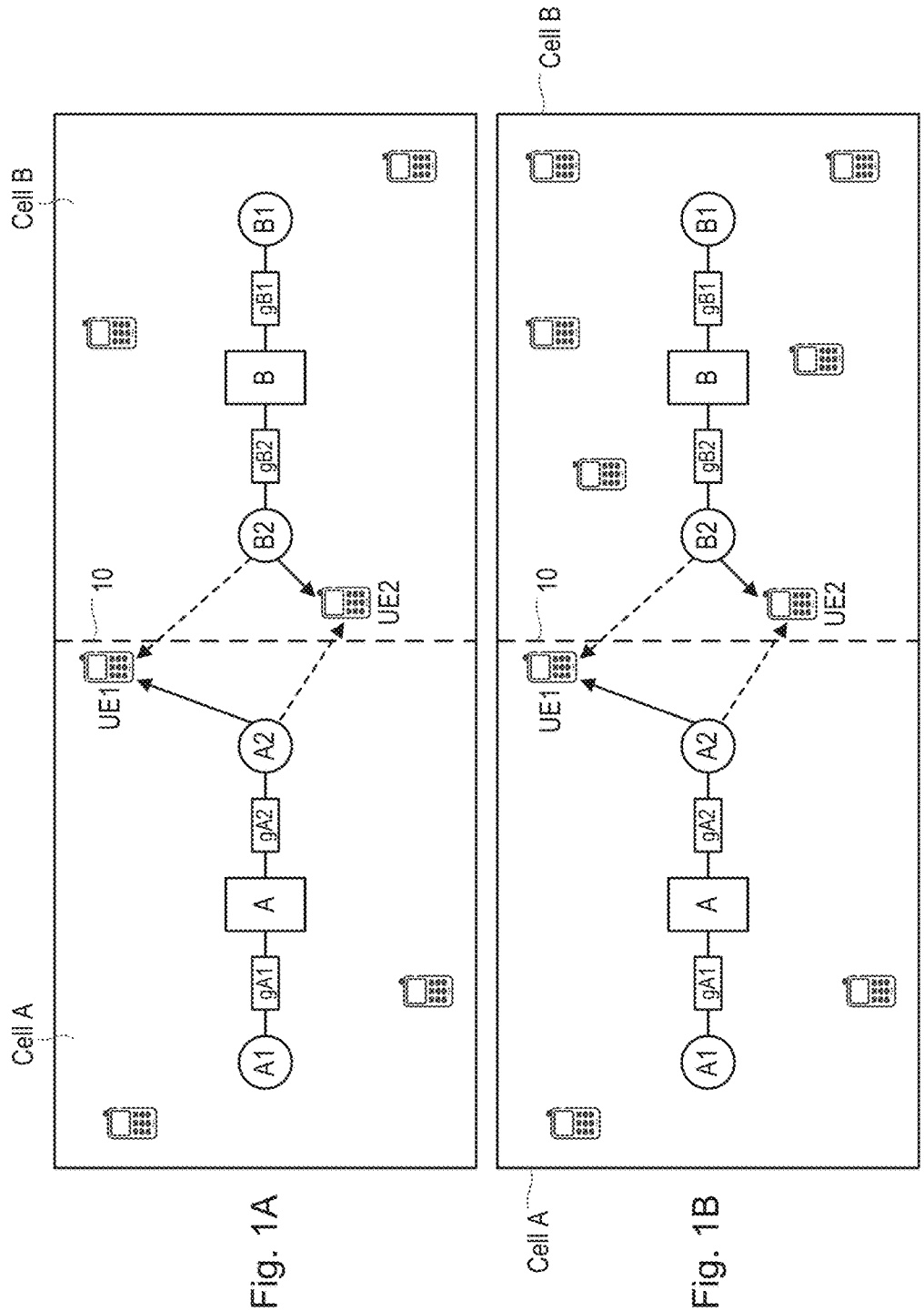

| CSI process for UE connected to cell A or cell B | Signal hypothesis | | Interference hypothesis | |
|---|---|---|---|---|
| | Cell A | Cell B | Cell A | Cell B |
| 1 | Using NZP CSI-RS 1, with reduced power for A1 and full power for A2 | Off by using CSI-IM 1 containing NZP CSI-RS 1 in cell A as a subset | Off by using CSI-IM 1 | Using NZP CSI-RS 1 (full power for B1 and B2) overlapping with CSI-IM 1 in cell A |
| 2 | Using NZP CSI-RS 2, with reduced power for A2 and full power for A1 | Off by using CSI-IM 1 containing NZP CSI-RS 2 in cell A as a subset | Off by using CSI-IM 1 | Using NZP CSI-RS 1 (full power for B1 and B2) overlapping with CSI-IM 1 in cell A |
| 3 | Using NZP CSI-RS 3, with full power for A1 and A2 | Off by using CSI-IM 1 containing NZP CSI-RS 3 in cell A as a subset | Off by using CSI-IM 1 | Using NZP CSI-RS 1 (full power for B1 and B2) overlapping with CSI-IM 1 in cell A |

Fig. 8

APPARATUS AND METHOD FOR INTER CELL INTERFERENCE COORDINATION

TECHNICAL FIELD

The present invention relates to an apparatus and method for inter cell interference coordination, and in particular to an apparatus and method for providing inter cell interference coordination in multi transmission point cells.

BACKGROUND

FIG. 1A shows an example of a network comprising a first cell (cell A) and a second cell (cell B), having a cell coverage boundary 10. If it is assumed that at least one of the first and second cells comprise multiple distributed transmission points (TPs), and that the cells are deployed close to each other, for example in the same floor of one building, then user equipments (UEs) close to the cell coverage boundary 10 may suffer strong inter cell interference (ICI). In this example cell A has two transmission points labeled A1 and A2, and cell B has two transmission points labeled B1 and B2. In such a scenario UE1 connected to cell A may suffer strong inter cell interference from transmission point B2, while UE2 connected to cell B may suffer strong inter cell interference from transmission point A2.

To help mitigate inter cell interference for cell-edge UEs, standardized inter cell interference coordination techniques can be used. For example, the serving cell A of a victim UE, e.g. UE1, can send a backhaul message to the aggressor cell B, requesting that cell B reduces its transmission power during certain subframes, so that inter cell interference from cell B to UE1 will be reduced, at least in those subframes. Cell B will then reduce the power of its transmission points B1 and B2 in certain subframes (known as reduced power subframes, RPSF), and send a RPSF pattern back to cell A, for example over an X2 backhaul interface. For example, both attenuators gB1 and gB2 in FIG. 1A can be set to −6 dB in some subframes to reduce power in those subframes. Cell A will then configure two channel state information (CSI) measurements for all the UEs in cell A, reflecting protected and non-protected subframes.

It is noted that cell A has no information about which UEs in cell A are strongly interfered by cell B and which are less interfered (since the UE positions in cell A are unknown).

FIG. 1B shows an example of another scenario whereby cell B is more loaded than cell A, and load balancing between the two cells is needed. Load balancing can be provided, for example, using standardized cell range expansion (CRE) and further enhanced inter-cell interference coordination (FeICIC) techniques. For example, a cell selection offset (CSO) of 6 dB can be applied to UEs in cell A to expand the coverage area of cell A, so that UE2 is connected to cell A instead of cell B. On the other hand, cell B may reduce its transmission power during RPSF, so that inter cell interference from cell B to UE2 will be reduced.

The scenarios described above have the disadvantage of leading to reduced capacity problems, because the aggressor cell will reduce the transmission power of all its transmission points simultaneously (e.g. both gB1 and gB2) in the RPSF subframes, leading to reduced performances of all UEs connected to the aggressor cell in those RPSF subframes.

SUMMARY

It is an aim of the present invention to provide a method and apparatus which obviate or reduce at least one or more of the disadvantages mentioned above.

According to a first aspect of the present invention there is provided a method for performing inter cell interference coordination between a first cell and a second cell of a communication network, wherein at least the first cell comprises a plurality of distributed transmission points. The method in the first cell comprises individually controlling the transmit power of the plurality of distributed transmission points within the first cell.

According to another aspect of the present invention there is provided a method for performing inter cell interference coordination between a first cell and a second cell of a communication network, wherein at least the first cell comprises a plurality of distributed transmission points. The method in the second cell comprises the steps of determining the strongest interfering transmission point or points of the first cell for a user equipment connected to the second cell, and notifying the first cell of the strongest interfering transmission point or points, for enabling the first cell to determine a two dimensional power reduction pattern for individually controlling the transmit power of the distributed transmission points within the first cell.

According to another aspect of the present invention there is provided a user terminal for use in a communication network comprising a first cell and a second cell, wherein at least the first cell comprises a plurality of distributed transmission points. The user terminal comprises a receiving module, and a processing means adapted, when connected to the second cell, to receive a downlink signal during subframes in which the strongest interfering transmission point of the first cell is transmitting at reduced power according to a two dimensional power reduction pattern.

According to another aspect of the present invention there is provided a control node for performing inter cell interference coordination between a first cell and a second cell of a communication network, wherein at least the first cell comprises a plurality of distributed transmission points. The control node comprises processing means adapted to individually control the transmit power of the plurality of distributed transmission points within the first cell according to a two dimensional power reduction pattern.

According to another aspect of the present invention there is provided a control node for performing inter cell interference coordination between a first cell and a second cell of a communication network, wherein at least the first cell comprises a plurality of distributed transmission points. The control node comprises processing means adapted to determine the strongest interfering transmission point or points of the first cell for a user equipment connected to the second cell. The control node comprises a transmitter module adapted to notify the first cell of the strongest interfering transmission point or points, for enabling the first cell to determine a two dimensional power reduction pattern for individually controlling the transmit power of the distributed transmission points within the first cell.

BRIEF DESCRIPTION OF THE DRAWINGS

For a better understanding of examples of the present invention, and to show more clearly how the examples may be carried into effect, reference will now be made, by way of example only, to the following drawings in which:

FIGS. 1A and 1B show examples of communication networks having a first cell and a second cell;

FIG. 8 shows an example of a Table illustrating signal hypotheses and interference hypotheses for CSI processes;

DETAILED DESCRIPTION

Figure 2A:
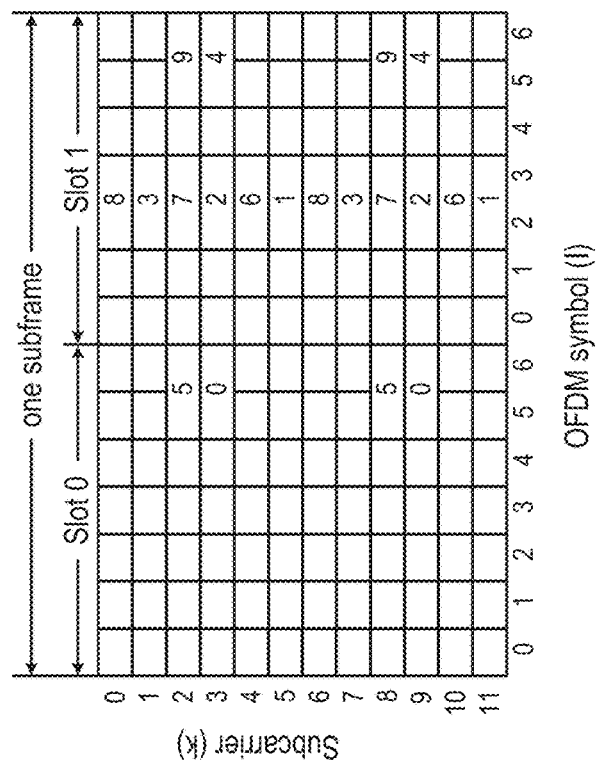
FIGS. 2A and 2B illustrate examples of configurations of channel state information reference signals (CSI-RS) for different numbers of antenna ports.

As described in the background section, inter cell interference is a problem in wireless communication networks, and coordination between cells is sometimes beneficial to improve system throughput and user experience. One example is heterogeneous network scenarios.

In heterogeneous networks, multiple low-power nodes (LPNs) are overlaid within a macro network to improve the network capacity. However, the coverage of the LPNs is usually limited due to the much higher output power from the macro network, and the capacity gain by using LPNs will not be significant since most user equipments (UEs) will connect to the stronger macro cell anyway.

Cell range expansion (CRE) is one way to solve the above problem. For CRE, a cell selection offset (CSO) can be added in the handover (HO) procedure in favor of the LPNs, so that the coverage areas of the LPNs are improved without increasing their output power. Hence, user equipments are biased to select the LPN as the serving cell. However, for user equipments in the CRE area, the signal from the macro cell is on average stronger than the signal from the LPN, so user equipments inside the CRE area of the LPN will experience strong downlink (DL) interference from the macro cell, and inter-cell interference coordination (ICIC) between the macro and the LPN is needed for such user equipments.

Reduced power subframe (RPSF), also known as almost blank subframes (ABS), can be used in the macro cell to mitigate the strong interference experienced by user equipments in the CRE area of an LPN, for example as described above in FIGS. 1A and 1B. For RPSF, the macro reduces the transmission activity during certain subframes, so that UEs in the CRE area will experience less interference from the macro during those subframes.

Therefore, an LPN may schedule the DL transmission for UEs in the CRE area during RPSF.

In further enhanced inter-cell interference coordination (FeICIC), introduced in LTE Rel-11, a RPSF pattern is sent from an aggressor cell (e.g. a macro cell) to a victim cell (e.g. a pico cell in the coverage area of the aggressor cell), for example by signaling over the standardized X2 interface, further details of this interface being available in Section 9.2.5.4 of the technical specification relating to 3GPP TS 36.423 v11.2.0 (September 2012): "Evolved Universal Terrestrial Radio Access (E-UTRA); X2 application protocol (X2AP)". The RPSF pattern informs the victim cell over which subframes the transmit power of the aggressor cell will be reduced (e.g. the ABS or RPSF pattern). For frequency division duplex (FDD), the RPSF pattern is a length-40 binary vector, with 0 indicating a normal subframe and 1 indicating a reduced power subframe.

When the victim cell receives this RPSF information from the aggressor cell, it knows about the two different types of subframes, those with potential high interference and those with lower interference from the aggressor cell. This can then be used to configure channel state information (CSI) feedback measurements from the UE for these two different subframe types. This is useful because, otherwise, the UE would most likely average the interference across both high and low interference subframes, which would result in poor link adaptation, and make it difficult to benefit from using subframes in the LPN with lower interference. As will be described below, it is possible in LTE to configure at least two independent measurements, which can be used by a victim cell to perform the link adaptation for a UE when scheduled in either a RPSF subframe or in a non-RPSF subframe.

Coordinated multipoint transmission and reception (CoMP) contains another CSI feedback framework that can support inter-cell interference coordination, further details of which can be found in Section 5.1 of the technical specification relating to 3GPP TR 36.819 v11.2.0 (September 2013): "Coordinated multi-point operation for LTE physical layer aspects".

CoMP can be used to improve the throughput of cell-edge users. Many features supporting CoMP have been standardized in LTE Rel-11, including the provision of multiple CSI reports from a single UE. A CoMP measurement set, consisting of multiple cells, can be configured for each UE individually, and multiple CSIs corresponding to cells in the set are estimated by the UE. With the feedback of CSIs from a UE, transmission can be coordinated among cells in the set to improve the performance. However, nothing prevents a network to use the CSI feedback framework also in a non-CoMP context, for instance in a heterogeneous scenario.

Prior to discussing embodiments of the present invention, further details will first be provided about CSI feedback.

Figure 2B:
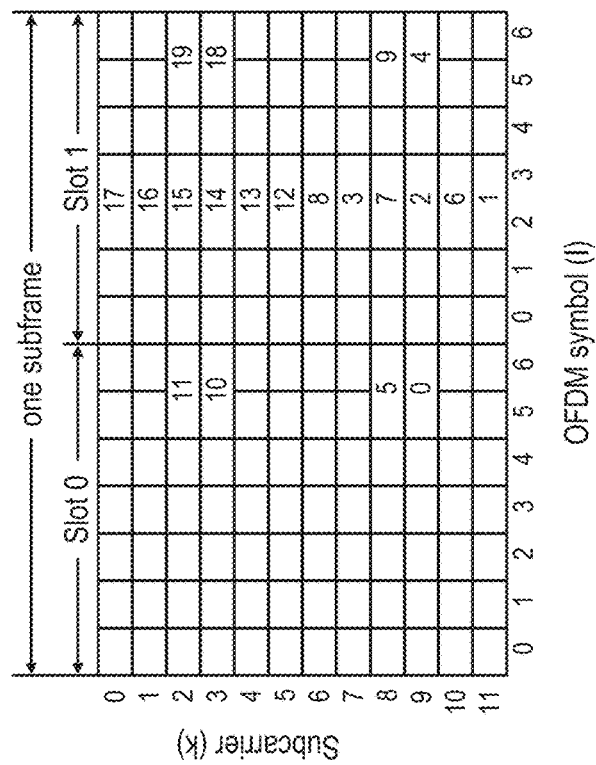

The resource allocation in LTE is typically described in terms of resource blocks (RB), where a RB corresponds to one slot (0.5 ms) with 7 OFDM symbols in the time domain and 12 contiguous subcarriers in the frequency domain, as illustrated in FIGS. 2A and 2B. The resource over one OFDM symbol in the time domain and one subcarrier in the frequency domain is called a resource element (RE). A pair of two adjacent resource blocks in the time direction (1 ms) is known as a resource block pair.

In LTE Rel-8, cell-specific reference signals (CRSs) are used in the downlink for CSI estimation and feedback, and for channel estimation for demodulation. CRSs are transmitted in subframes and are defined to support up to 4 antenna ports (APs). In LTE Rel-10, to support up to 8 APs, CSI reference signals (CSI-RS) are defined, to enable a UE to measure and feedback CSI using the multiple antenna ports. Further details about this can be found in Sections 7.2.5, 7.2.6 and 7.2.7 of the technical specifications relating to 3GPP TS 36.213 v11.3.0 (June 2013): "Evolved Universal Terrestrial Radio Access (E-UTRA); Physical layer procedures".

Each CSI-RS resource consists of two REs over two consecutive OFDM symbols, and two different CSI-RS (for two different antenna ports) can share the same CSI-RS resource (two REs) by code division multiplexing (CDM). Also, CSI-RS can be transmitted once per 5, 10, 20, 40 or 80 ms, called CSI-RS periodicity, further details of which can be found in Section 6.10.5 of the technical specification relating to 3GPP TS 36.211 v11.5.0 (December 2013): "Evolved Universal Terrestrial Radio Access (E-UTRA); Physical channels and modulation".

Therefore, CSI-RS has a lower overhead and lower duty-cycle when compared with CRS. On the other hand, CSI-RS is not used as a demodulation reference as CRS is. Different CSI-RS can also be transmitted with different offsets in a subframe, called CSI-RS subframe offset, as described in Section 6.10.5 of 3GPP TS 36.211 mentioned above.

FIGS. 2A and 2B show examples of mappings from different CSI-RS configurations to REs in a resource block pair.

FIG. 2A shows an example of the mapping for one or two antenna ports, where 20 configurations are possible. The two CSI-RS of the two antenna ports of an own cell can be transmitted, for example, by configuration 0 by CDM, while CSI-RS of antenna ports of other neighboring cells can be transmitted by configuration j with $0<j<20$, to avoid RS collisions with the CSI-RS in the own cell.

FIG. 2B shows an example of the mapping for four antenna ports, where ten configurations are possible. The four CSI-RS of the four antenna ports of an own cell can be transmitted, for example, by configuration 0 by CDM, while CSI-RS of antenna ports of other neighboring cells can be transmitted by configuration j with $0<j<10$.

The OFDM symbols used by the two consecutive REs for one CSI-RS are QPSK symbols, which are derived from a specified pseudo-random sequence.

To randomize the interference, the initial state of the pseudo-random sequence generator is determined by the detected cell ID or a virtual cell ID configured to the UE by radio resource control (RRC) signaling. CSI-RS with such non-zero-power OFDM symbols is called non-zero-power CSI-RS (NZP CSI-RS).

On the other hand, zero-power CSI-RS (ZP CSI-RS) can also be RRC configured to the user equipment for the purpose of interference measurement (IM) in transmission mode 10 only, or in transmission mode 9 or 10 for the purpose of improving the CSI estimation in other cells. However, the CSI-RS mapping with four antenna ports is used by the ZP CSI-RS.

For example, in FIGS. 2A and 2B, if configuration 0 with NZP CSI-RS is used by cell A to estimate the CSI of the two antenna ports in cell A, configuration 0 with ZP CSI-RS (total of four REs) can be used by the neighboring cell B to minimize the downlink interference to cell A over the two REs in configuration 0, such that the CSI estimation of the two antenna ports in cell A can be improved.

In LTE transmission mode 10 (TM10), up to four CSI processes can be configured for a user equipment by RRC signaling, further details of which may be found in Sections 6.3.2 and 6.4 of the technical specification relating to 3GPP TS 36.331 v12.1.0 (March 2014): "Evolved Universal Terrestrial Radio Access (E-UTRA); Radio Resource Control (RRC); Protocol specification". These four CSI processes can, for example, be used to acquire CSI for antenna ports in up to four different cells (or transmission points) in the CoMP framework. In order for a user equipment to derive the correct CSI, each CSI process is associated with a signal hypothesis and an interference hypothesis. The signal hypothesis describes which NZP CSI-RS reflects the desired signal. The interference is measured in a configured CSI-IM resource, which is similar to a CSI-RS with four resource elements (REs) per PRB pair, which the user equipment can use for interference measurements.

To better support the interference measurement (IM) in CoMP, CSI-IM is standardized, as defined in technical specification 3GPP TS 36.213 mentioned above, and is based on the ZP CSI-RS. Therefore, each of the up to four CSI processes consists of one NZP CSI-RS and one CSI-IM.

A limitation in LTE is that all CSI-IM (for all CSI processes configured to the UE) must reside in the same subframe and be covered by a zero power (ZP) CSI-RS which can be configured for the UE. Furthermore, the UE can be configured with up to three NZP CSI-RS and three CSI-IM resources. These can then be combined to up to four CSI-processes to the UE. Moreover, a UE can be configured with four ZP CSI-RS patterns, where a ZP CSI-RS can cover from four REs up to forty REs in a subframe, in steps of four REs, where each group of four REs covers a NZP CSI-RS with four antenna ports.

For transmission mode 9 user equipment, only a single CSI process can be configured, and no CSI-IM is defined. The interference measurement is thus unspecified in TM9. There is, however, still a possibility to obtain CSI feedback from two different subframe (SF) sets: SF set 1 and SF set 2. For example, based on the RPSF information signaled over X2, a pico eNB can configure a user equipment to feedback CSI for both protected (i.e. RPSF) subframes (where the macro has reduced activity) and CSI for unprotected subframes in two different CSI reports. This gives the pico eNB information to perform link adaptation in the two types of subframes differently, depending on whether it is a protected subframe or not.

It is also possible for a UE configured in transmission mode 10 (TM10) to use both subframe sets and multiple CSI processes.

Irrespectively of which CSI framework is used for a UE, an eNB needs to know which subframes are protected and which are not, since the interference can be very different in these two alternatives. More generally, it needs to know how to configure the CSI measurements and how to report depending on the activity in the other cells. As mentioned above, the tools are two subframe sets for TM9 and TM10 user equipments and additionally up to four CSI processes for TM10 user equipments. The eNB can obtain this information by signaling over an X2 interface between eNBs, i.e. the RPSF pattern discussed earlier. The RPSF pattern thus provides information on how to configure the CSI measurements.

The embodiments that will be described herein relate to providing inter cell interference coordination in a network that comprises at least one distributed cell.

Distributed cells are defined as cells with multiple distributed transmission points (TPs). Distributed cells can be used to cover signal dead spots or to increase the system capacity. They are useful, for example, in indoor environments with complex floor plans, including inner walls and elevator shafts, which will cause many signal dead spots (or coverage holes). For a cell with multiple transmission points, it will be assumed for explanation purposes that the same signal is simultaneously transmitted from all of its transmission points, i.e. that all transmission points have the same cell ID. An example of such a cell with multiple transmission points is the present Applicant's Radio Dot System (RDS).

It is noted that, even if all transmission points are transmitting the same signal synchronously, they do not necessarily need to transmit with the same transmit power. Hence, in the embodiments described herein, the notion of "same signal" still allows for reduced power, including the power being completely switched off as a particular case. Hence, a transmission point in a distributed cell can have zero power while the non-zero-power transmission points are transmitting the same signal.

Furthermore, it is noted that the notion of "same signal" comes with some time and frequency tolerances. For instance, a time difference of a fraction of the cyclic prefix length between two transmission points can still be considered as the "same signal" if transmitted from the two transmission points. Additionally, a phase difference between transmitted signals from different transmission points can still be regarded as the "same signal" since it has no impact on the system performance, since it is not possible to distinguish this phase shift from the additional phase shift induced by the radio channel.

Figure 3:
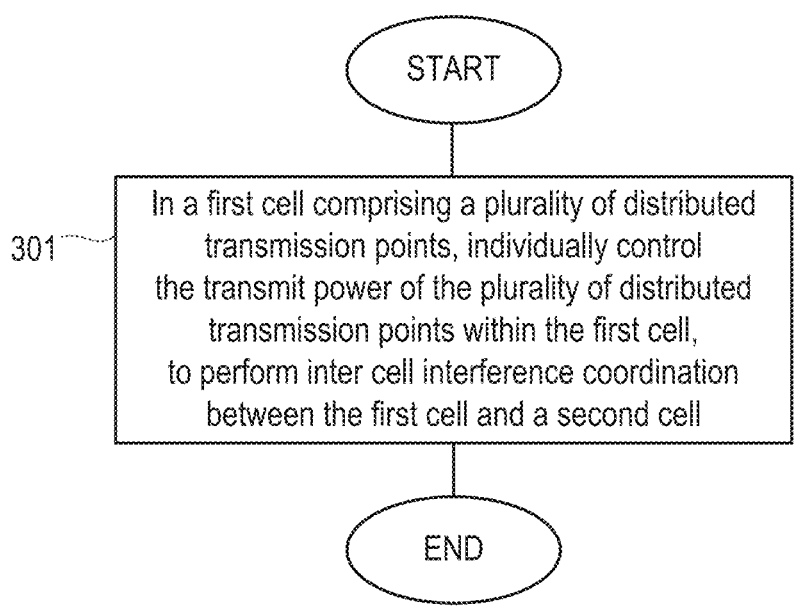
FIG. 3 shows an example of a method according to an embodiment of the present invention.

FIG. 3 shows a method according to a first embodiment of the present invention, for performing inter cell interference coordination (ICIC) between a first cell A (for example an aggressor cell) and a second cell B (for example a victim cell) of a communication network, wherein at least the first cell A comprises a plurality of distributed transmission points (TPs). The method in the first cell A, for example an aggressor cell, comprises individually controlling the transmit power of the plurality of distributed transmission points within the first cell A, step 301.

By being able to individually control the transmit power of each distributed transmission point to perform inter cell interference coordination, this has the advantage of improving the performance of victim UEs in the second cell B, while not impacting the performance in most UEs connected to the first cell A (e.g. the aggressor cell).

The step of individually controlling the transmit power may comprise determining a two dimensional power reduction pattern for controlling which subframes, if any, of each transmission point of the first cell A are to be transmitted at a reduced power, wherein the power reduction pattern for a particular transmission point is individual to that transmission point, and may be the same or different to a power reduction pattern for one or more other transmission points in the first cell A.

This has the advantage of being able to transmit the same signal from all transmission points, but reduce transmission power of individual transmission points over different subframes. This may also comprise a group of transmission points being controlled using the same pattern.

According to one embodiment, the step of determining a power reduction pattern for a selected one or more transmission points may comprise the steps of receiving information from the second cell B identifying which one or more transmission points of the first cell A are causing interference to a user equipment, e.g. UE2, connected to the second cell B, and reducing the transmit power in certain subframes of the one or more transmission points determined as causing interference.

The one or more determined transmission points may comprise the strongest interfering transmission point of the first cell A for a user equipment of the second cell B, or a sub-set of strongest interfering transmission points of the first cell A for a user equipment of the second cell B, or one or more transmission points of the first cell A that cause a threshold level of interference to a user equipment of the second cell B.

The determined two dimensional power reduction pattern may be sent to the second cell B, for enabling the second cell B to determine which transmission points of the first cell A are transmitting at reduced power during which subframes.

This has the advantage of enabling the victim cell B to know which transmission points of the aggressor cell A are transmitting at lower power in which subframes.

Figure 4:
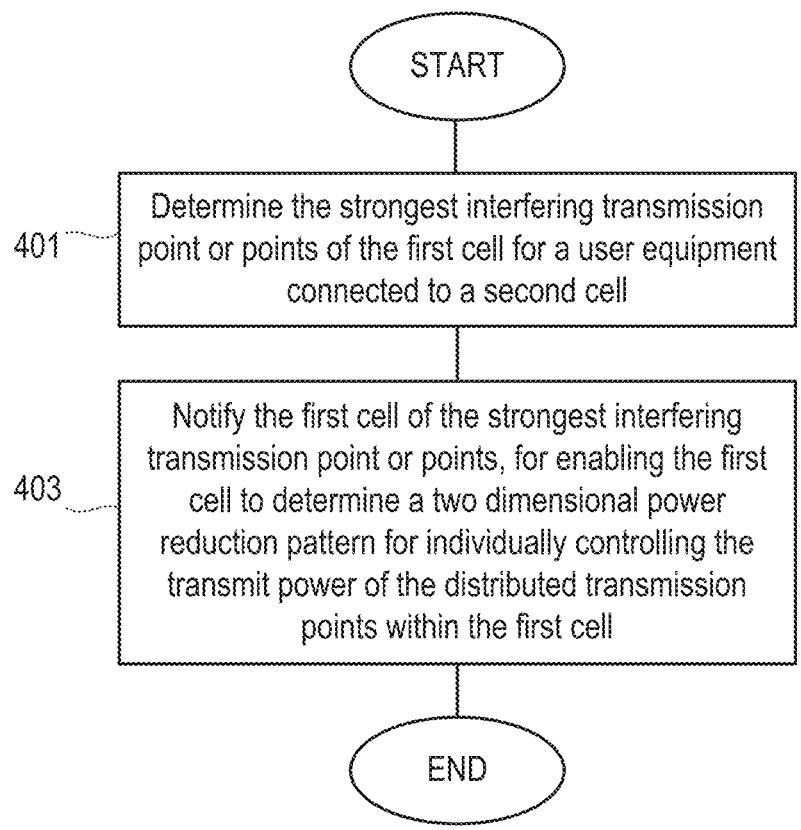
FIG. 4 shows an example of a method according to another embodiment of the present invention.

FIG. 4 shows a method that may be performed by another embodiment of the present invention, for performing inter cell interference coordination between a first cell A and a second cell B of a communication network, wherein at least the first cell A comprises a plurality of distributed transmission points. The method of FIG. 4, performed in the second cell B (for example a victim cell), comprises the steps of determining the strongest interfering transmission point or points of the first cell A for a user equipment, e.g. UE2, connected to the second cell B, step 401. The method further comprises the step of notifying the first cell A of the strongest interfering transmission point or points, for enabling the first cell A to determine a two dimensional power reduction pattern for individually controlling the transmit power of the distributed transmission points within the first cell A, step 403.

It is noted that since the multiple transmission points are distributed, the interference from different transmission points of an aggressor cell, such as cell A, will have different strength depending on whether a UE in the victim cell, such as cell B, is close to one of the transmission points (e.g. TP A1) or the other transmission point (e.g. TP A2). This is different from interference handling in prior art systems where a single localized transmission point has been used as in traditional networks.

As seen from above, and as will be explained in further detail below, the embodiments of the invention can be based around two aspects, these being an identification process and an inter-cell interference coordination process.

With regard to the identification process, according to embodiments of the present invention a victim cell may transmit the same signal from all transmission points with full power. An aggressor cell can continue to transmit the same signal from all transmission points but may reduce transmission power of individual transmission points over different subframes. Hence, this provides reduced power subframes that is applicable for distributed cells, whereby a transmission point, or a subset of transmission points, reduce (or disable) the transmission power in a given subframe, this being individually controllable to provide inter cell interference coordination. A two-dimensional (2D) RPSF pattern is sent from an aggressor cell to a victim cell, for example by backhaul signaling. This provides information to the victim cell that there are more than one "type" of RPSF subframes (in the example, depending on whether A1 or A2 has reduced power), so that CSI processes can be properly set up for UEs in the victim cell to identify the strongest interfering transmission point from the aggressor cell. CSI processes can be properly set up for UEs in the aggressor cell to identify the strongest serving transmission point from the aggressor cell.

With regard to the inter-cell interference coordination process, according to embodiments of the invention a victim cell can request that the aggressor cell reduces transmission power over certain transmission points, for example using signaling through an X2 interface or other central processing unit. The aggressor cell can continue to transmit the same signal from all transmission points, but may reduce transmission power of a selected one or more transmission points, which may be the same as, or different than those suggested by the victim cell, over different subframes. This means that the strongest interfering transmission point (e.g. TP A2) to a victim cell can reduce the power (which includes using zero power) while other more isolated transmission points (e.g. TP A1) can continue to transmit with full power or less reduced power. A two dimensional RPSF pattern is sent from an aggressor cell to a victim cell. This provides information to the victim cell that there are more than one "type" of RPSF subframes (in the example, depending on whether A1 or A2 has reduced power) so that the CSI measurements can be properly configured for UEs in the victim cell reflecting either type of subframe. Alternatively, load balancing can be performed based on CRE, using this information.

Figure 5:
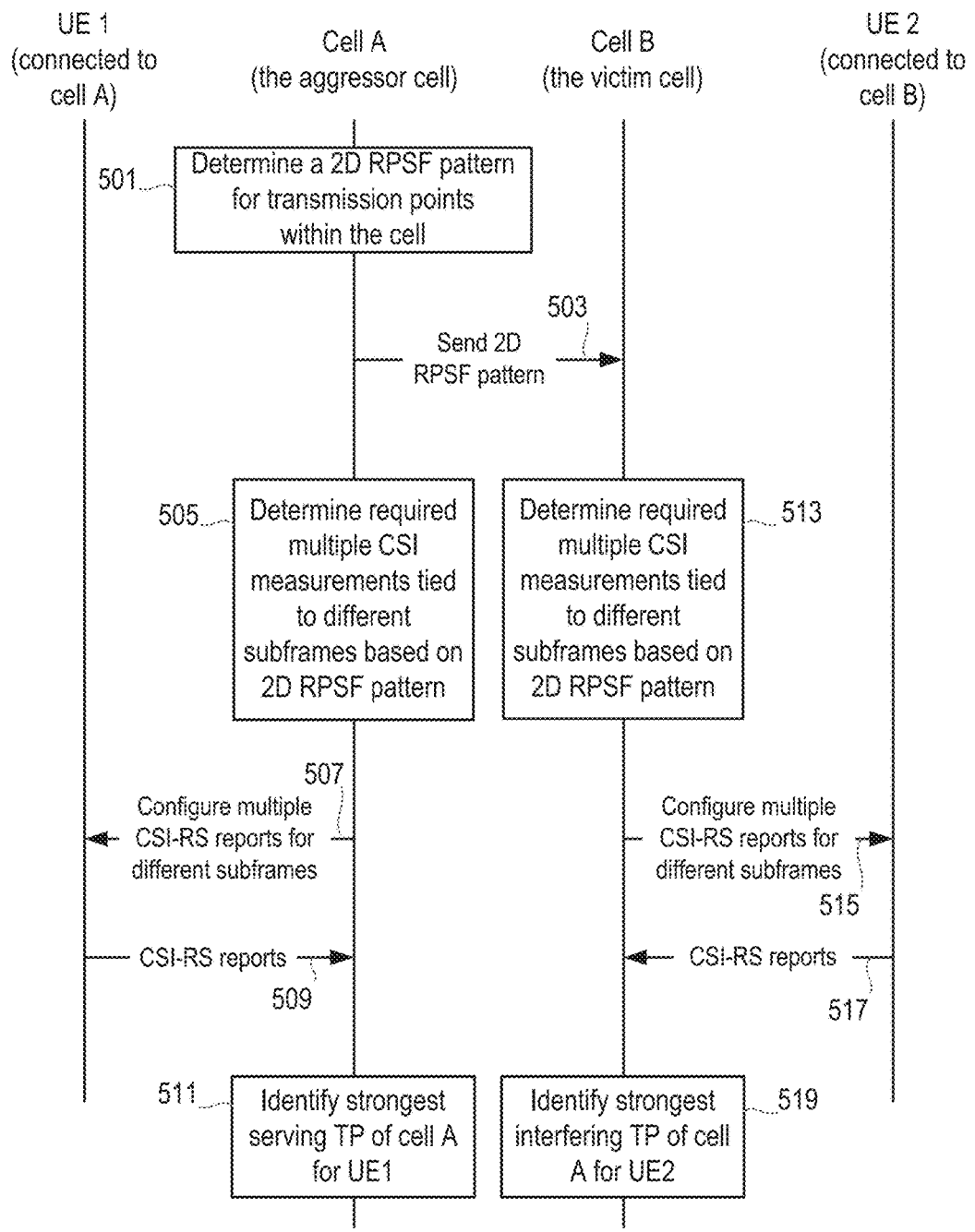
FIG. 5 shows an example of a method according to another embodiment of the present invention.

FIG. 5 shows the steps that may be performed by various embodiments of the present invention in connection with the first aspect relating to the identification process. In this example a first user equipment UE1 is connected to a first cell A (for example an aggressor cell), and a second user equipment UE2 is connected to a second cell B (for example a victim cell).

In step 501 the aggressor cell, cell A, determines a two dimensional RPSF pattern for transmission points within the cell. In step 503 the two dimensional RPSF pattern is sent from cell A to cell B.

According to one embodiment, the first cell A (aggressor cell) may then perform the step of determining which multiple channel state information, CSI, measurements are required, tied to different subframes, based on the determined two-dimensional power reduction pattern for transmission points within the first cell A, step 505. The first cell A can then send a signal to a user equipment, e.g. UE1 connected to the first cell A, configuring a plurality of CSI reference signal (CSI-RS) reports for different subframes, step 507. In step 509 the first cell A receives CSI reference signal reports from the user equipment UE1 connected to the first cell A. The received CSI reference signal reports are used to identify the strongest serving transmission point of the first cell A for the user equipment connected to the first cell A, step 511.

The step of using the received CSI reference signal reports may comprise the steps of comparing a plurality of CSI reference signal reports received from the user equipment UE1 connected to the first cell A, determining which CSI reference signal report has the lowest channel quality indicator (CQI) value, and identifying a transmission point having the lowest CQI value as being the strongest serving transmission point for that user equipment UE1.

Since lowering the power of the strongest serving transmission point impacts more on the channel quality indicator CQI than lowering of other transmission points, this can be used to conclude that the transmission point with reduced power in the subframe where the CQI is lower is the strongest serving transmission point for the particular UE that reports the CQI.

The method performed in the second cell B (e.g. the victim cell), may comprise the step of receiving a two dimensional power reduction pattern from the first cell A, wherein the two dimensional power reduction pattern indicates when an individual transmission point in the first cell A will be reducing power in certain subframes, step 503. In step 513 the second cell B determines which multiple channel state information, CSI, measurements are required, tied to different subframes, based on the two dimensional power reduction pattern received from the first cell A. The second cell B configures a plurality of CSI reference signal reports for different subframes with the user equipment UE2 connected to the second cell B, step 515. The second cell B receives CSI reference signal reports from the user equipment UE2 connected to the second cell B, step 517. The received CSI reference signal reports are used to identify the strongest interfering transmission point or points of the first cell A for the user equipment UE2 connected to the second cell B, step 519.

According to one embodiment, the step of using the received CSI reference signal reports may comprise the steps of comparing a plurality of CSI reference signal reports received from the user equipment UE2 connected to the second cell B, determining which CSI reference signal report has the lowest channel quality indicator (CQI) value, and identifying a transmission point having the lowest CQI value as being the strongest interfering transmission point for that user equipment UE2.

According to an alternative embodiment, the strongest interfering transmission point may be deduced using transmission point identifiers, that may be provided in future releases of LTE. In such an embodiment, determining the strongest interfering transmission point or points may comprise comparing the power level of interfering signals received from each transmission point of the first cell A via the user equipment UE2 connected to the second cell B, wherein each interfering signal has an identifier for identifying the transmission point from which the interfering signal was transmitted, and using the identifier to determine which one or more transmission points are causing interference to the user equipment UE2 connected to the second cell B.

Figure 6:
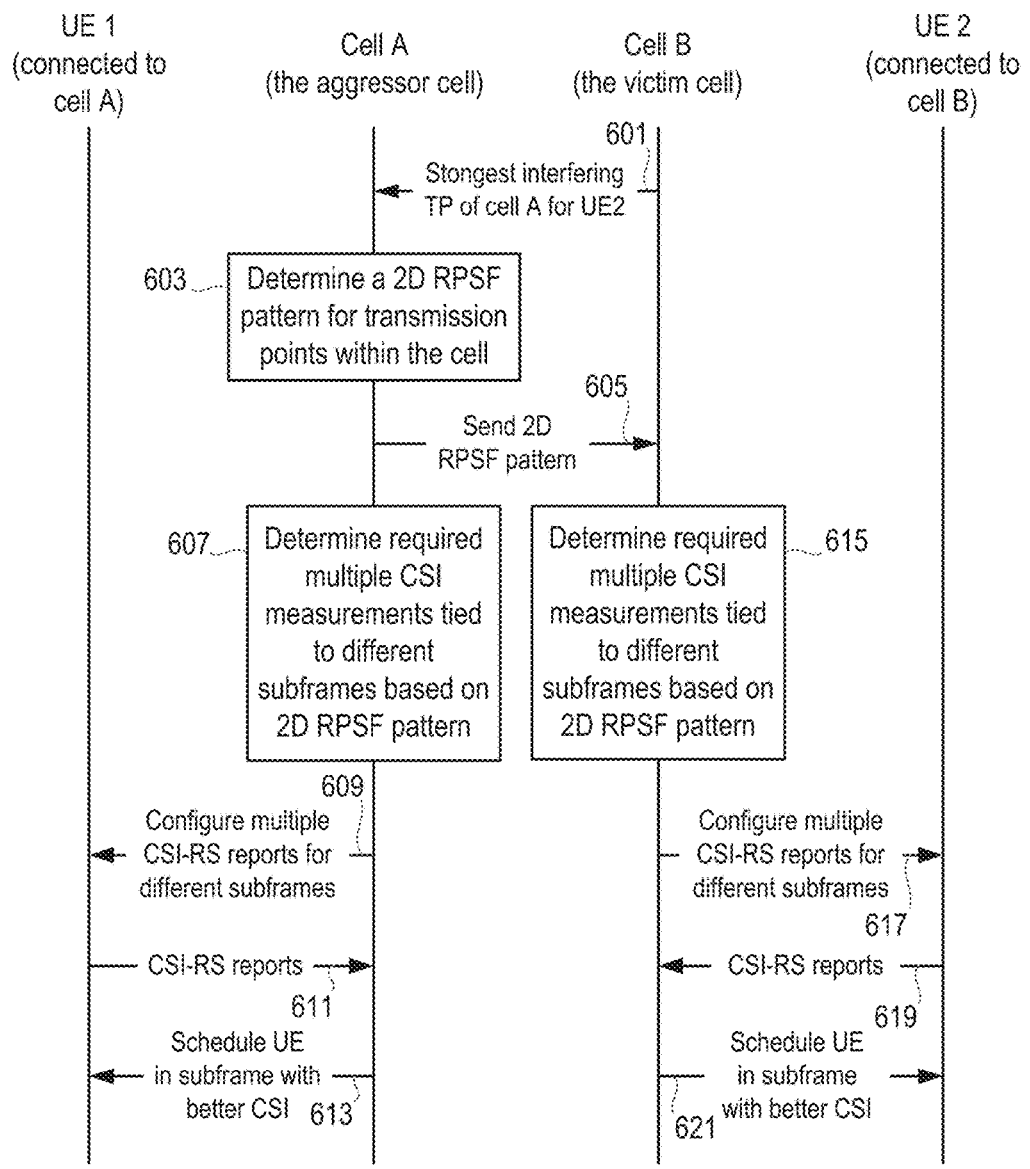
FIG. 6 shows an example of a method according to another embodiment of the present invention.

FIG. 6 shows the steps that may be performed by various embodiments of the present invention in connection with the second aspect relating to the inter-cell interference coordination process. As with FIG. 5, in this example a first user equipment UE1 is connected to a first cell A (for example an aggressor cell), and a second user equipment UE2 is connected to a second cell B (for example a victim cell).

In step 601 the first cell A (aggressor cell), receives information from the first cell B (victim cell) identifying the strongest interfering transmission point of the first cell A for the user equipment UE2 connected to the second cell B. This information may have been determined by the second cell B using the method described above, for example, in steps 513 to 519 of FIG. 5. It is noted that other methods may be used for determining this information, including methods which use transmission point identifiers that may be provided with future releases of LTE. In step 603 the first cell A determines a two dimensional RPSF pattern for transmission points within the cell. In step 605 the two dimensional RPSF pattern is sent from the first cell A to the second cell B.

According to one embodiment, a method in the first cell A (aggressor cell) comprises the steps of determining which multiple channel state information, CSI, measurements are required, tied to different subframes, based on the determined power reduction pattern for selected transmission point(s) within the first cell A, step 607. The method comprises configuring a plurality of CSI reference signal (CSI-RS) reports for different subframes with a user equipment, e.g. UE1, connected to the first cell A, step 609, and receiving CSI reference signal reports from the user equipment (UE1) connected to the first cell A, step 611. The first cell A can then schedule the user equipment (UE1) connected to the first cell A, step 613, in subframes according to the received CSI reference signal reports.

This enables UE1 to be scheduled, for example, in subframes having better CSI.

During subframes where the strongest interfering transmission point or points of the first cell A are transmitting at a reduced power, the first cell A may schedule an user equipment whose strongest serving transmission point is not the strongest interfering transmission point or points.

The step of configuring a plurality of CSI reference signal reports may comprise the steps of: configuring non-zero power CSI reference signals, NZP CSI-RS, in a first set of configurations, and configuring CSI interference measurement, CSI-IM, in a second set of configurations in the first cell A; and configuring CSI-IM in a third set of configurations, the third set of configurations containing the first set of configurations as a sub-set, and NZP CSI-RS in the second set of configurations in the second cell B.

With regard the method performed by a second cell B in FIG. 6, according to one embodiment the second cell B schedules a user equipment connected to the second cell B, e.g. UE2, by receiving a two dimensional power reduction pattern from the first cell A, step 605, wherein the two dimensional power reduction pattern indicates when a selected transmission point in the first cell A will be reducing power in certain subframes. The method further comprises determining which multiple channel state information, CSI, measurements are required, tied to different subframes, based on the two dimensional power reduction pattern received from the first cell A, step 615. In such an embodiment the method in the second cell B further comprises configuring a plurality of CSI reference signal reports for different subframes with the user equipment UE2 connected to the second cell B, step 617, receiving CSI reference signal reports from the user equipment UE2 connected to the second cell B, step 619, and using the received CSI reference signal reports to schedule the user equipment UE2 connected to the second cell B, step 621.

This has the advantage of enabling cell B to schedule UEs connected to cell B in subframes, for example, having better CSI.

According to one embodiment the second cell B schedules a user equipment UE2 connected to the second cell B by: receiving a two dimensional power reduction pattern from the first cell A, wherein the two dimensional power reduction pattern indicates when a selected transmission point in the first cell A will be reducing power in certain subframes; and scheduling the user equipment UE2 connected to the second cell B during subframes when a strongest interfering transmission point for that user equipment UE2 is transmitting at reduced power.

In the embodiments described herein, a two dimensional power reduction pattern may comprise a two dimensional array comprising k rows and L columns, wherein each row relates to a respective transmission point of the first cell A, or a group of respective transmission points of the first cell A, and wherein each of the L columns relates to a set of periodic subframes of a signal being transmitted by a respective transmission point, or group of respective transmission points of the first cell A, and wherein an entry in the two dimensional array indicates whether a transmission point or group of transmission points of the first cell A has a reduced power or not.

The two dimensional power reduction pattern may comprise a two dimensional reduced power subframe, RPSF, control signal.

A more detailed explanation of the embodiments above will now be given with reference to FIGS. 7 to 12 and the examples described below.

Examples 1 to 7 described below correspond to the first aspect relating to the identification process described above in FIG. 5, while Examples 8 and 9 correspond to the second aspect relating to the inter cell interference coordination (ICIC) process described above in FIG. 6. However, it is noted that during the identification process, the ICIC process can also be applied to some UE(s), and vice versa.

Example 1

Figure 7A:
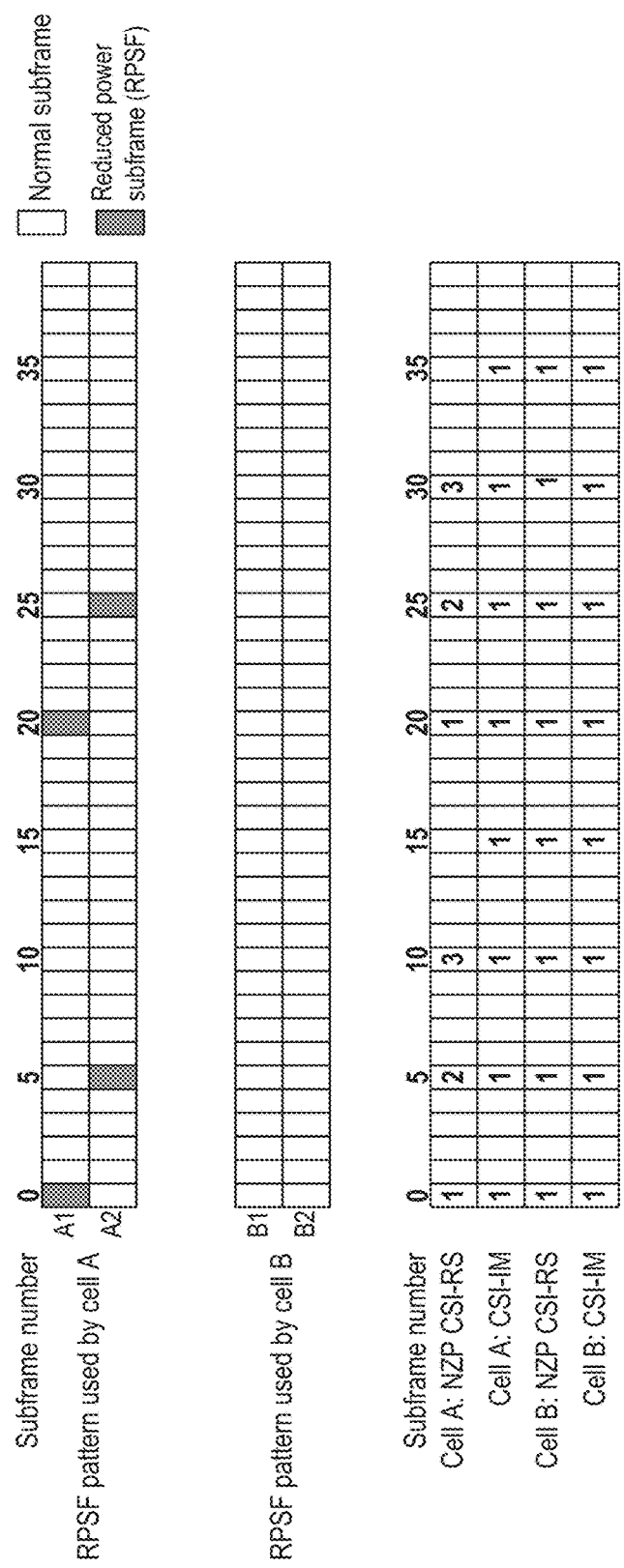
FIGS. 7A to 7C illustrate an example of an application of embodiments of the present invention.
Figures 7B, 7C:
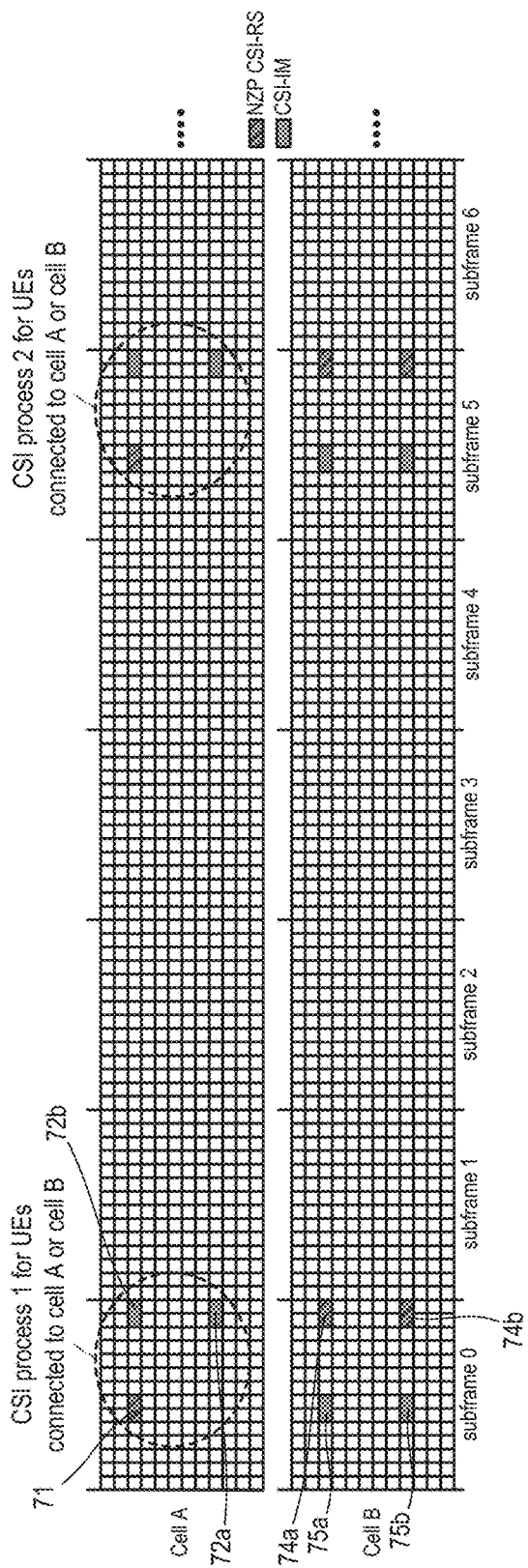

For cells with multiple transmission points, the concept of RPSF pattern signaling over backhaul, e.g. X2, is extended according to embodiments of the present invention with an additional dimension to include, for example, the spatial domain for different distributed transmission points. This is done, for example, by the use of a two dimensional (2D) RPSF matrix. In the example of FIGS. 7A to 7C, the 2D RPSF pattern for cell A is a 2-by-40 matrix (as shown at the top of FIG. 7A), with k rows (for example two in the example) for transmission points Ak, (i.e. k=1 and k=2 in the example). The columns represent the subframes. After 40 subframes the pattern repeats itself, so the periodicity in the RPSF pattern is equal to the number of columns, in this example 40.

The 2D RPSF patterns used by cell A and cell B can be exchanged, for example, through an X2 interface using a modified X2 protocol, or through some other central processing unit. For the sake of clarity in the description, in this example it is assumed that there are two transmission points for each cell, and multiple CSI processes are assigned to different scenarios where the transmit power of one transmission point in one cell is reduced. However, it is noted that the embodiments are also intended to embrace more than two transmission points per cell with individual reduced power, such that the 2D RPSF matrix can be extended to include more rows (i.e. additional rows relating to each transmission point).

The exchanged 2D RPSF patterns are used to guide the CSI-RS resources that can be set up for cell A and cell B to identify the strongest serving transmission point for each UE connected to cell A, as shown in FIGS. 7A to 7C and the Table of FIG. 8. The 3 CSI processes are set up for UEs connected to cell A over different sets of subframes to match with the 2D RPSF pattern used by cell A in FIGS. 7A to 7C. The signal hypothesis and interference hypothesis for each CSI process is also set up such that the correct CSI can be derived, as shown in the Table of FIG. 8.

For example, take CSI process 1 for UEs connected to cell A in FIGS. 7A to 7C as an example. From the 2D RPSF pattern in FIG. 7A, the transmission power of A1 will be reduced over the set of subframes {0, 20}, and CSI process 1 is set up accordingly over the same set of subframes by using CSI-RS periodicity=20 (subframes), and CSI-RS subframe offset=0. One NZP CSI-RS and one CSI-IM are used by CSI process 1 during one subframe, where configuration 11 for two antenna ports (as illustrated in FIG. 2A above) is used for the NZP CSI-RS (labeled 71 in FIG. 7B), and configuration 9 for four antenna ports (as illustrated in FIG. 2B above) is used for CSI-IM (labeled 72a and 72b in FIG. 7B). For a UE connected to cell A, the signal hypothesis of CSI process 1 assumes that the channel estimation from the cell A NZP CSI-RS 1 is for the signal estimation, and the interference hypothesis of CSI process 1 assumes that the channel estimation from the cell A CSI-IM 1 is for the interference estimation, as shown in the Table of FIG. 8 and FIG. 7C. It is noted that the Table of FIG. 8 provides information on how to set up the CSI-RS resources in cell A and cell B, but does not fully provide information to an UE on where (which resources) to measure the signal, and where to measure the interference. Such information to the UE is provided by FIG. 7C.

An example of CSI measurement in an UE is the CQI estimation, which is equal to signal estimation divided by interference estimation. That is, an UE needs to estimate (or measure) the signal part over one set of resources (e.g., 71 in FIG. 7B or cell A NZP CSI-RS 1) and the interference part over another set of resources (e.g., 72*a* and 72*b* in FIG. 7B or cell A CSI-IM 1). Therefore, the UE needs to be informed by its serving cell (or some central processing unit) about which resources are for signal estimation, which resources are for interference estimation, and when (which subframe) to make such measurements.

It is also noted that the hypotheses in the Table of FIG. 8 are examples only, and that different hypotheses may be used.

An UE connected to cell A can be ordered by cell A to measure the three CSI processes transmitted from cell A, and feedback three individual CSI-RS reports to cell A. Since lowering power of the strongest serving transmission point impacts more on the channel quality indicator (CQI) than lowering power of other transmission points, it can be concluded that the transmission point with reduced power in the subframes where the CQI is lower is the strongest serving transmission point for the particular UE that reports the CQI. Cell A then compares the first two CSI-RS reports, and identifies the strongest serving transmission point for the UE by finding which CSI-RS report has the lowest CQI value. For example, if CQI in CSI-RS report 2 has the lowest value among CQI's of the first two CSI-RS reports from UE1, A2 is identified by cell A as the strongest serving transmission point for UE1.

Cell A may also identify the weakest serving transmission point for an UE connected to cell A by finding which CSI-RS report has the highest CQI value among CQI's of the first two CSI-RS reports. For example, if CQI in CSI-RS report 1 has the highest value among CQI's of the first two CSI-RS reports from UE1, A1 is identified by cell A as the weakest serving TP for UE1.

Example 2

CSI-RS resources in cell B can be set up in a way to improve the CSI estimation in cell A. Take CSI process 1 in FIGS. 7A to 7C as an example. NZP CSI-RS 1 in cell B is set up by using CSI-RS periodicity=5 (subframes) and CSI-RS subframe offset=0. By using configuration 9 for four antenna ports (as illustrated above in FIG. 2B) for the NZP CSI-RS 1 in cell B (labeled in FIG. 7B as 74*a* and 74*b*), interference measurement in cell A will be improved since cell B will always transmit interference (by NZP CSI-RS 1) to cell A. By using configuration 5 for four antenna ports (as illustrated in FIG. 2B) for CSI-IM 1 in cell B (labeled 75*a* and 75*b* in FIG. 7B), signal estimation in cell A will be improved since cell B will not generate interference to cell A by using ZP CSI-IM 1.

Example 3

The same 2D RPSF patterns and CSI-RS resources in Example 1 and Example 2 can be set up for cell A and cell B to identify the strongest interfering transmission point for each UE connected to cell B, as shown in FIGS. 7A to 7B. The same CSI processes (as those for UEs connected to cell A) in Example 1 are also used for UEs connected to cell B, as shown in FIG. 7C. For the purpose of CQI estimation, we use the same signal and interference hypotheses (as those for UEs connected to cell A) in the Table of FIG. 8, i.e. it is assumed that cell A is the "signal" and cell B is the "interference" during the CQI estimation, even though UEs under consideration are currently connected to cell B.

An UE connected to cell B can be ordered by cell B to measure the three CSI processes transmitted from cell A, and feedback three individual CSR-RS reports to cell B. Since lowering power of the strongest serving transmission point impacts more on the CQI than lowering power of other transmission points, it can be concluded that the transmission point with reduced power in the subframes where the CQI is lower is the strongest serving transmission point for the particular UE that reports the CQI. Cell B then compares the first two CSI-RS reports, and identifies the strongest interfering transmission point (of cell A) for an UE by finding which CSI-RS report has the lowest CQI value. Then the identified transmission point of cell A is the strongest interfering transmission point for the UE since the UE is currently connected to cell B. For example, if CQI in CSI-RS report 2 has the lowest value among CQI's of the first 2 CSI-RS reports from UE2, A2 is identified by cell B as the strongest interfering transmission point for UE2.

Cell B may also identify the weakest interfering transmission point (of cell A) for an UE connected to cell B by finding which CSI-RS report has the highest CQI value among CQI's of the first two CSI-RS reports. For example, if CQI in CSI-RS report 1 has the highest value among CQI's of the first 2 CSI-RS reports from UE2, A1 is identified by cell B as the weakest interfering transmission point for UE2.

Example 4

The identification process in the preceding Examples can be performed for each newly arrived UE into the system. After the first identification, the identification process for an existing UE can be performed periodically with a long periodicity if the UE is stationary or has low mobility, for example, an indoor UE. The identification process can be triggered by some event; for example, when some key performance indicator (KPI) of an existing UE degrades below some threshold.

Thus, according to one embodiment, the steps of determining the strongest interfering transmission point or points are performed once for a newly arrived user equipment into the second cell B, or periodically with a long periodicity for a user equipment that is stationary, or has a mobility level which is below a threshold value, in the second cell B.

Example 5

Figure 9:
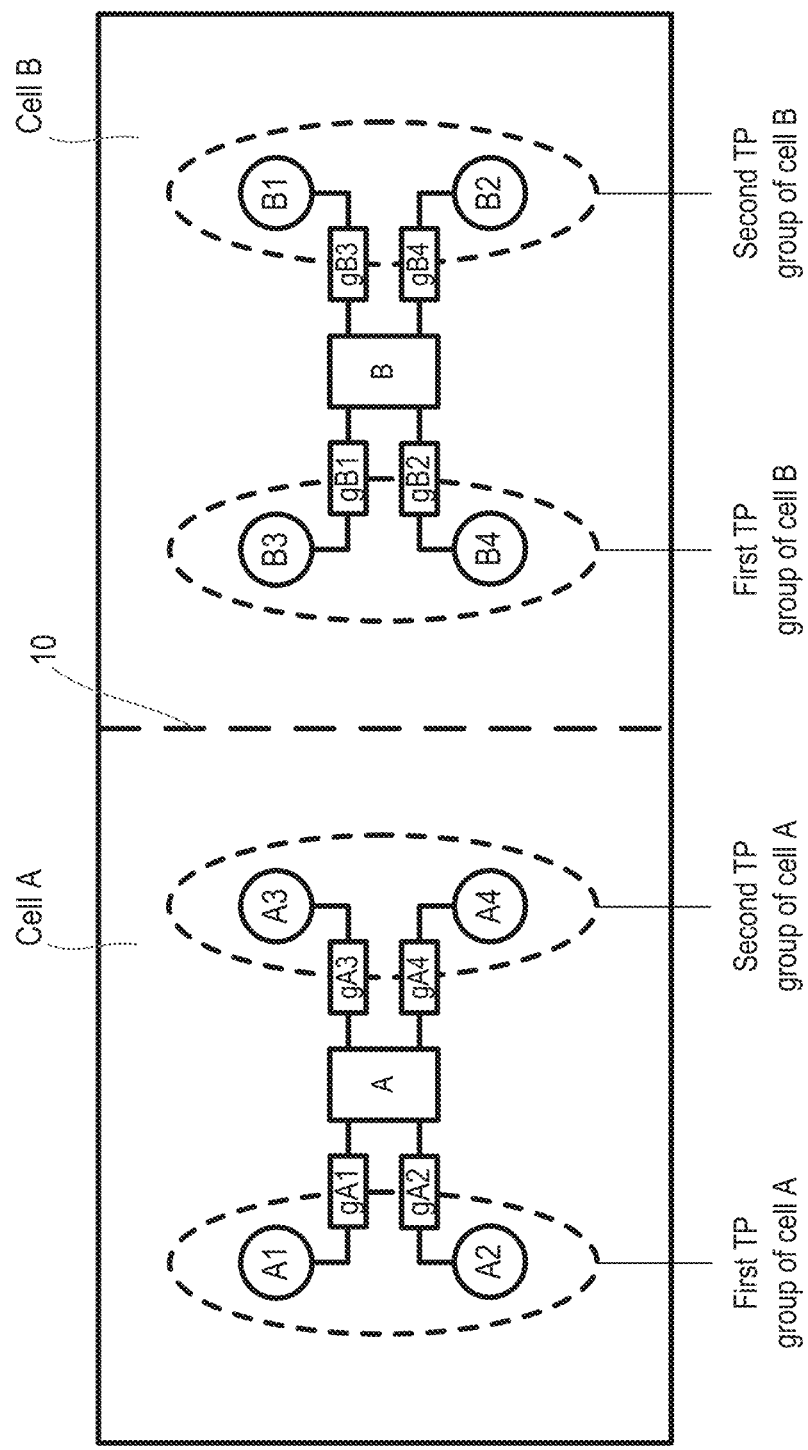
FIG. 9 shows an example of how transmission point groups may be formed for cells with multiple transmission points, according to an embodiment of the present invention.
Figure 10:
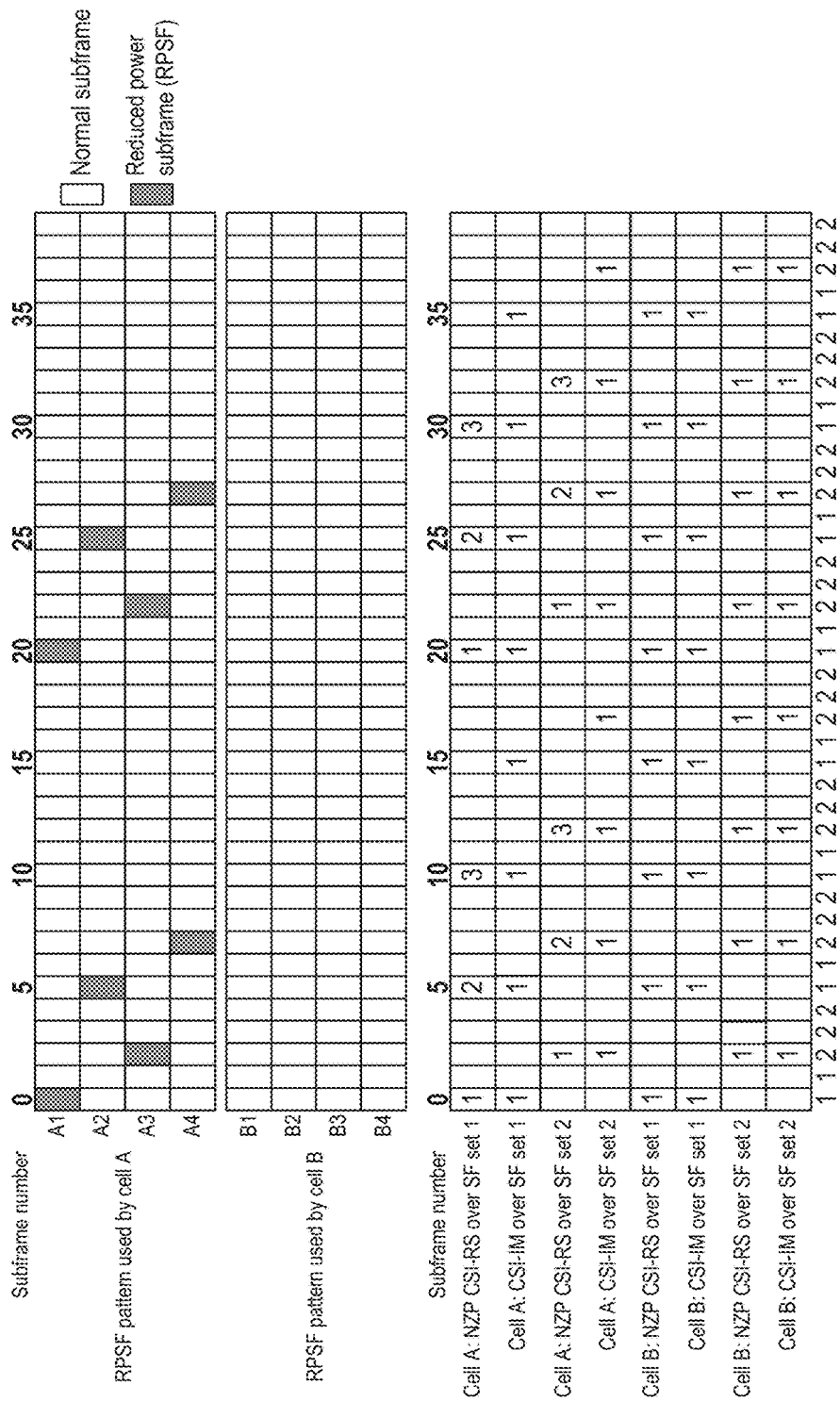
FIG. 10 illustrates an example of an application of embodiments of the present invention.

Examples 1 to 4 can be extended to cover the scenario where one cell has more than 2 transmission points. As up to four CSI processes can be set up for one UE at one time in the current 3GPP specifications, transmission point groups can be formed by grouping several transmission points into one TP group, as shown in FIG. 9. Then, Examples 1 to 4 can be applied to identify the strongest (or weakest) serving TP group, and strongest (or weakest) interfering TP group. For the purpose of ICIC, the transmission power of all the transmission points in the strongest interfering TP group will be reduced.

Example 6

Examples 1 to 4 can be extended to cover the scenario where one cell has more than two transmission points. As up to four CSI processes can be set up for one UE at one time in the current 3GPP specifications, the identification process in Examples 1 to 4 can be performed in a sequential manner. For example, assume that cell A has four transmission points: A1, A2, A3 and A4. Then the first three CSI processes can be set up for UE1 connected to cell A over {A1, A2} to perform the first identification process on which transmission point from {A1, A2} is the strongest serving transmission point for UE1. After the first identification process is done (and it is assumed that A1 was the identified transmission point, for example), the second three CSI processes can be set up for UE1 connected to cell A over {A3, A4} to perform the second identification process on which transmission point from {A3, A4} is the strongest serving transmission point for UE1. After the second identification process is done (and it is assumed that A3 was the identified transmission point), the third three CSI processes can be set up for UE1 connected to cell A over {A1, A3} to perform the third identification process on which transmission point from {A1, A3} is the strongest serving transmission point for UE1. After the third identification process is done, and it is assumed that A1 is the identified transmission point, it can be concluded that A1 is the strongest serving transmission point among all transmission points to UE1. It is noted that other combinations for comparing pairs of transmission points may also be provided, and for any number of transmission points.

Thus, according to one embodiment, wherein the first cell A comprises more than two distributed transmission points, the method of determining the strongest interfering transmission point or points comprises the steps of comparing interference from at least first and second pairs of transmission points in a series of comparison steps.

Example 7

Examples 1 to 4 can be extended to cover the scenario where one cell has more than 2 transmission points. As up to four CSI processes can be set up for one UE at one time in the current 3GPP specifications, CSI processes can be set up over two different subframe (SF) sets to increase the total number of CSI processes and CSI-RS reports. An example is given in FIG. 10, where each cell has four transmission points and the subframes are divided into two SF sets: SF set 1={0, 1, 5, 6, . . . , 35, 36} and SF set 2={2, 3, 4, 7, 8, 9, . . . , 37, 38, 39}. The same 2D RPSF patterns, CSI-RS resources and CSI processes as in FIGS. 7A to 7C can be set up over SF set 1 to get the first three CSI-RS reports (from UEs connected to cell A or UEs connected to cell B), which are related to transmission points A1 and A2. The same 2D RPSF patterns, CSI-RS resources and CSI processes as in FIGS. 7A to 7C can be set up over SF set 2, but with a shift of 2 subframes to the right, to get the second three CSI-RS reports (from UEs connected to cell A or UEs connected to cell B), which are related to transmission points A3 and A4. Then, the first two CQI values from the first 3 CSI-RS reports (CQI Report 1, 2 and 3) and the first two CQI values from the second 3 CSI-RS reports (CQI Report 4, 5 and 6) can be used (total of four CQI values for four transmission points) to perform the identification process. For example, if the CQI in CSI-RS report 2 has the lowest value among four CQI's of the CSI-RS reports 1, 2, 4 and 5 from UE1, A2 is identified by cell A as the strongest serving transmission point for UE1.

As a further explanation of the above, if it is assumed that cell A has two transmission points (A1 and A2), the 2D RPSF patterns and CSI resources in FIG. 7A can be used to identify the strongest serving transmission point for an UE connected to cell A, by comparing two CQI (from CSI-RS reports 1 and 2). However, the method in FIG. 7A is not suitable for the identification process when the cell has four (or more) transmission points due to the limitation of the current 3GPP specification.

To overcome this, the sub-sets are used to effectively double the number of CSI-RS reports without violating the current 3GPP specifications. For example, if the subframes are divided into two sets (SF1 and SF2), then the limitation mentioned above only applies within each subframe set (SF1 or SF2).

For example, if it is now assumed that cell A has four transmission points, then 2D RPSF patterns and CSI resources in FIG. 7A are used to obtain the two CQI for A1 and A2. It is noted that all the CSI-RS measurements occur at subframes {0, 5, 10, 15, 20, . . . }, which is a subset of SF set 1.

For A3 and A4, everything in FIG. 7A is carefully moved to the right by 2 subframes such that the CSI-RS measurements occur at subframes {2, 7, 12, 17, 22, . . . }, which is a subset of SF set 2. Hence, since everything is within SF set 2, the CSI-RS measurements can be repeated (as those done in SF set 1) to obtain another two CQI for A3 and A4.

It is noted that it is also possible to move everything in FIG. 7A to the right by three or 4 subframes, since everything after movement will still belong to SF set 2.

Finally, with a total of four CQI available for A1, A2, A3, and A4, the strongest serving transmission point for a UE connected to cell A can then be determined, which is the transmission point with the lowest CQI value among four CQIs.

Example 8

After receiving a two dimensional RPSF pattern used by cell A, for example using any of the techniques described above, cell B can configure CSI reports for the different types of subframes respectively using the received two dimensional RPSF pattern from neighboring cells. This will then give the necessary information to schedule its cell-edge UEs during proper subframes with less interference and using the correct link adaptation. If CSI reports for other types of subframes are available from the UE, the UE can also be scheduled in a subframe with higher interference, but with a lower modulation and code rate.

Figure 11:
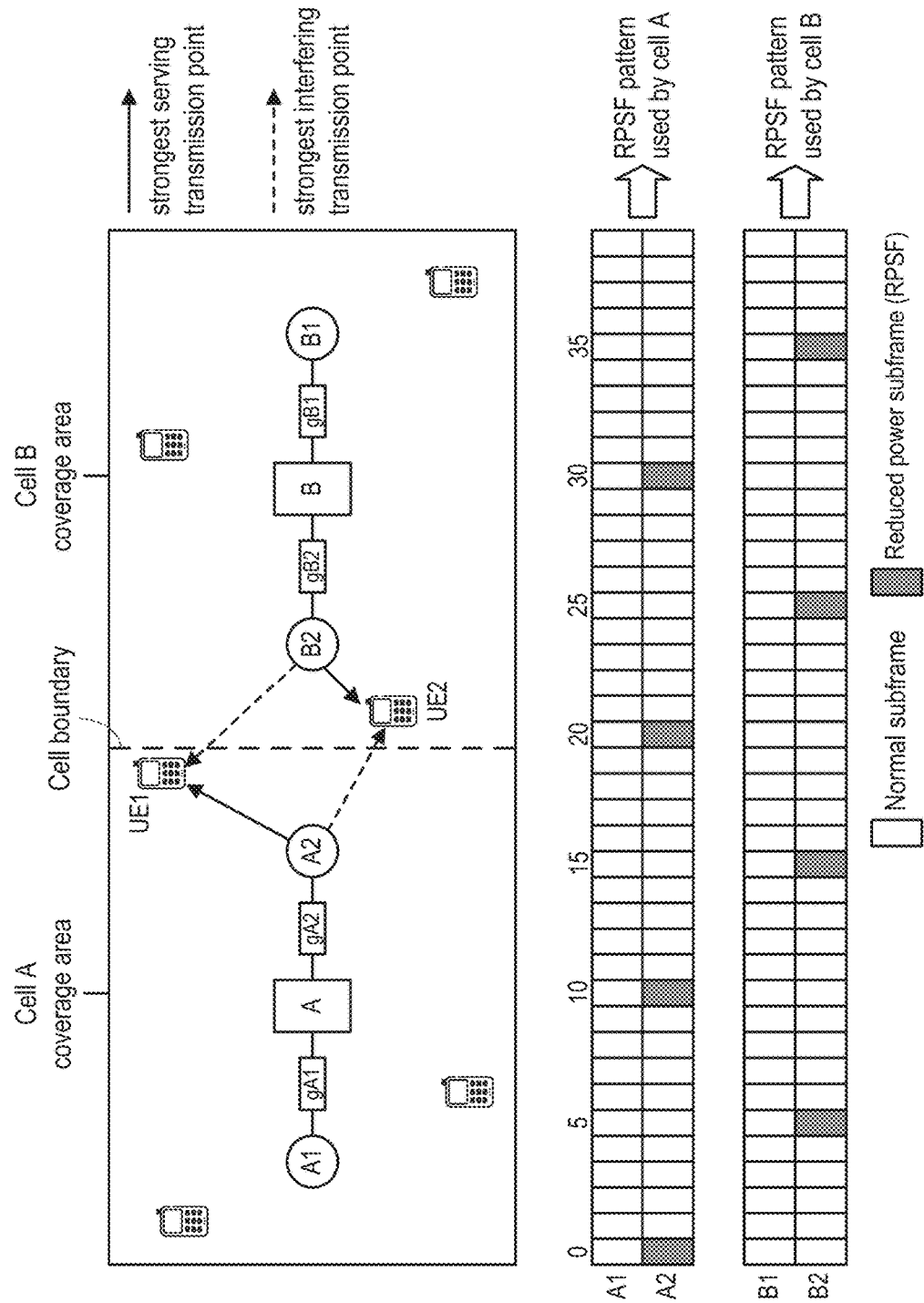
FIG. 11 illustrates an example of an application of embodiments of the present invention.

For the example shown in FIG. 11, with the knowledge that A2 is the strongest interfering transmission point to UE2, cell B can try to schedule UE2 during subframes 0, 10, 20, etc. By doing so the strong inter-cell interference from A2 to UE2 can be greatly reduced, and the performance of UE2 can be improved. On the other hand, during subframes 0, 10, 20, etc, cell A can try to schedule UEs whose strongest serving transmission point is not A2.

Example 9

Figure 12:
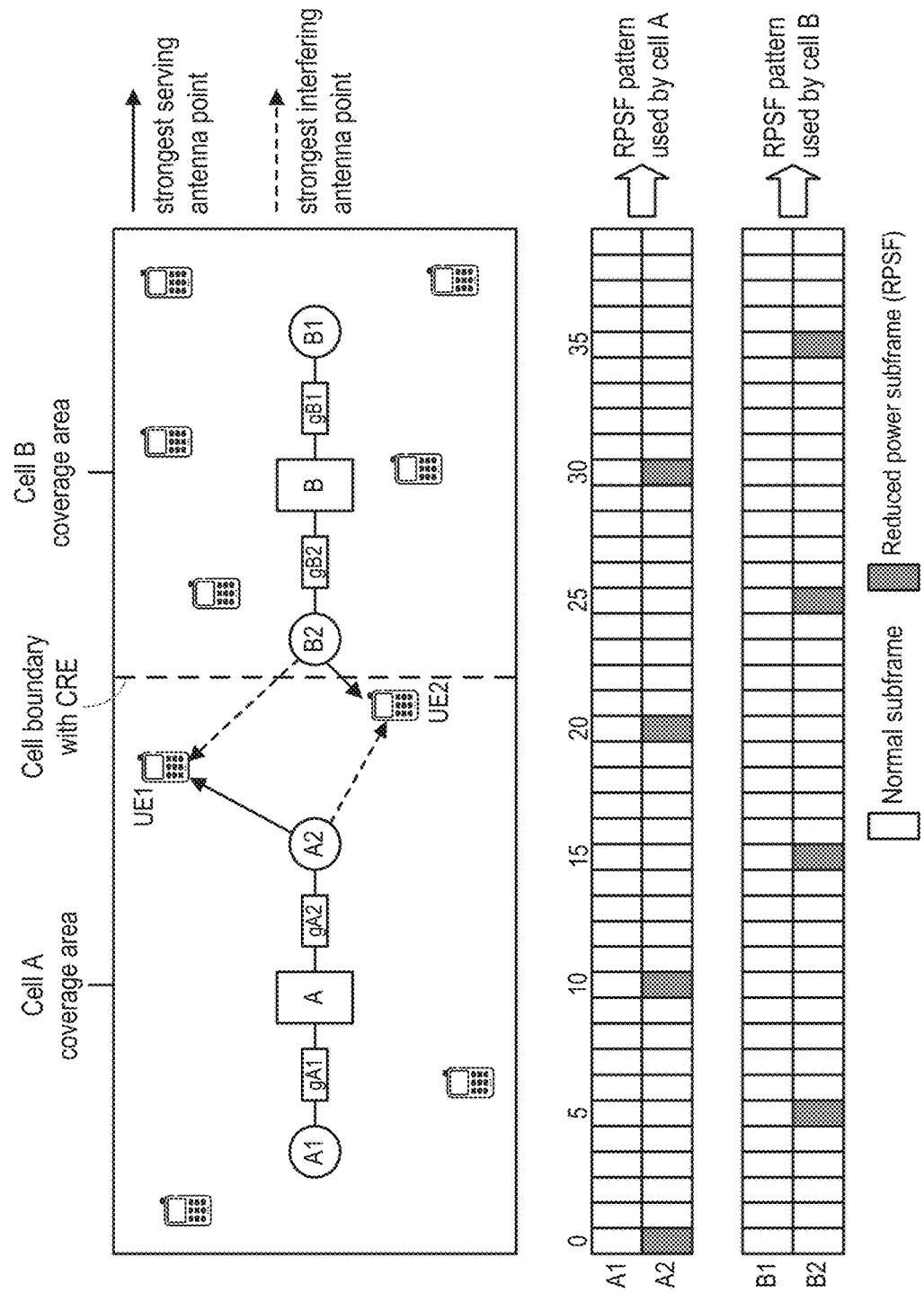
FIG. 12 illustrates an example of an application of embodiments of the present invention.

Referring to FIG. 12, in Example 9 it is assumed that cell B is more loaded than cell A, and load balancing between two cells is needed. Cell range expansion (CRE) of cell A into the coverage area of cell B can be performed by adding some cell selection offset (CSO) to RSRP measurement of cell A, such that UE2 is connected to cell A instead. After receiving the two dimensional RPSF pattern used by cell B, and with the knowledge that B2 is the strongest interfering transmission point to UE2, cell A can try to schedule UE2 during subframes 5, 15, 25, etc. By doing so the strong inter-cell interference from B2 to UE2 can be greatly reduced, and the performance of UE2 can be improved. On the other hand, during subframes 5, 15, 25, etc, cell B can try to schedule UEs whose strongest serving transmission point is not B2.

From the embodiments and the examples described above, it can be seen that the strongest serving transmission point(s) and strongest interfering transmission point(s) for UEs in cells with multiple distributed transmission points are identified.

Distributed transmission points belonging to the same cell can be grouped, and individual transmit power reduction performed for each transmission point group.

A two dimensional RPSF pattern can be determined where each row reflects a transmission point (or transmission point group) and each column reflects a subframe, and where the entries, e.g. binary values, indicate whether the transmission point (or transmission point group) has reduced power or not.

The embodiments and examples can also provide signaling of two dimensional RPSF patterns over backhaul, e.g. X2, between network nodes such as eNBs so that multiple CSI measurements (for the different subframes) can be configured for a UE in a receiving cell. This enables CSI measurements that better reflect the spatially distributed nature of distributed transmission points used in the aggressor cell to be performed.

Figure 13:
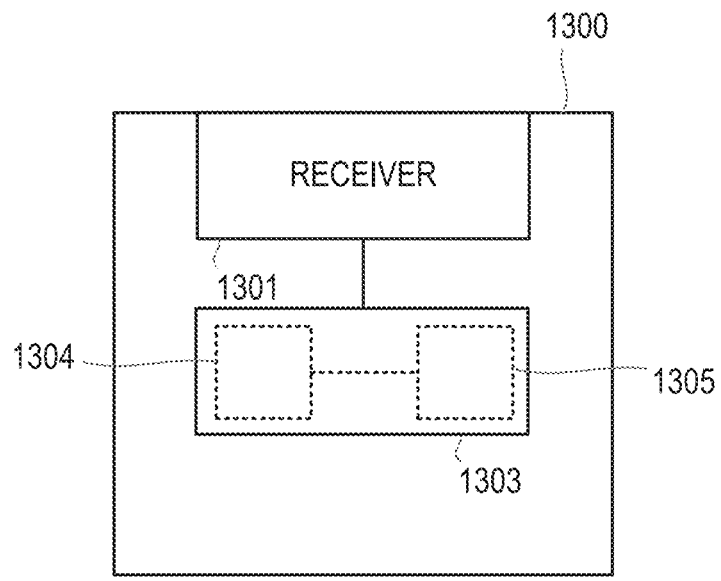
FIG. 13 shows an example of a user terminal according to an embodiment of the present invention.

FIG. 13 shows an example of a user terminal 1300 for use in a communication network comprising a first cell A and a second cell B, wherein at least the first cell A comprises a plurality of distributed transmission points. The user terminal 1300 comprises a receiving module 1301, and a processing means 1303 adapted, when connected to the second cell B, to receive a downlink signal during subframes in which the strongest interfering transmission point of the first cell A is transmitting at reduced power according to a two dimensional power reduction pattern.

The processing means may comprise a processor 1304 and a memory 1305, wherein said memory 1305 contains instructions executable by said processor 1304.

Figure 14:
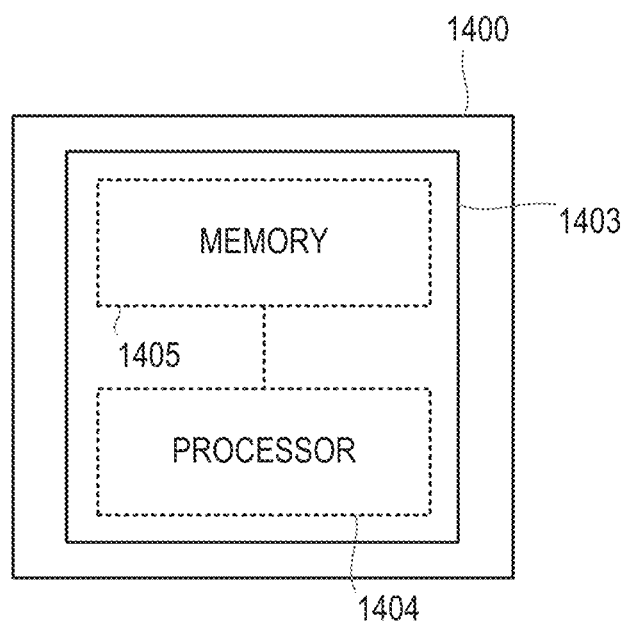
FIG. 14 shows an example of a control node according to an embodiment of the present invention.

FIG. 14 shows an example of a control node 1400 for performing inter cell interference coordination between a first cell A and a second cell B of a communication network, wherein at least the first cell comprises a plurality of distributed transmission points. The control node 1400 may comprise, for example, an eNodeB or other control node in the first cell A. The control node 1400 comprises processing means 1403 adapted to individually control the transmit power of the plurality of distributed transmission points within the first cell A according to a two dimensional power reduction pattern. The control node 1400 can be adapted in this way when effectively acting as an aggressor cell. It is noted that the control node 1400 may be further adapted when acting as a victim cell, for example to operate as described in FIG. 15 below.

The processing means 1403 may comprise a processor 1404 and a memory 1405, wherein said memory 1405 contains instructions executable by said processor 1404, and stores the two dimensional power reduction pattern.

Figure 15:
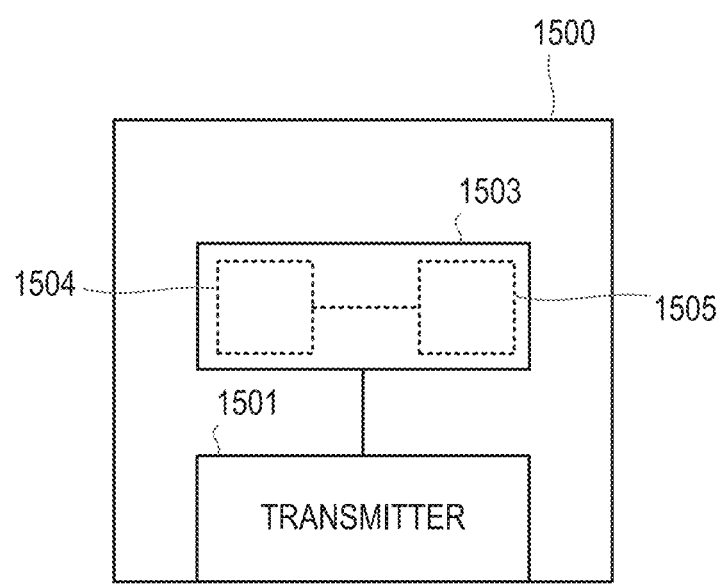
FIG. 15 shows an example of a control node according to another embodiment of the present invention.

FIG. 15 shows an example of a control node 1500 for performing inter cell interference coordination between a first cell A and a second cell B of a communication network, wherein at least the first cell A comprises a plurality of distributed transmission points. The control node 1500 comprises processing means 1503 adapted to determine the strongest interfering transmission point or points of the first cell A for a user equipment UE2 connected to the second cell B. The control node 1500 comprises a transmitter module 1501 adapted to notify the first cell A of the strongest interfering transmission point or points, for enabling the first cell A to determine a two dimensional power reduction pattern for individually controlling the transmit power of the distributed transmission points within the first cell A. The control node 1500 can be adapted in this way when effectively acting as a victim cell. It is noted that the control node 1500 may be further adapted when acting as an aggressor cell, for example to operate as described in FIG. 14 above.

The processing means 1503 may comprise a processor 1504 and a memory 1505, wherein said memory 1505 contains instructions executable by said processor.

According to another aspect there is provided a two dimensional reduced power subframe, RPSF, control signal, for performing inter-cell interference coordination.

According to another aspect there is provided a terminal (for example an aggressor cell, or node in an aggressor cell) for performing inter cell interference coordination between a first cell (A) and a second cell (B) of a communication network, wherein at least the first cell comprises a plurality of distributed transmission points. The terminal comprises a control module for individually controlling the transmit power of the plurality of distributed transmission points within the first cell when performing inter cell interference coordination.

The terminal may further comprise a determining module to determine a two dimensional power reduction pattern for controlling which subframes, if any, of each transmission point of the first cell (A) are to be transmitted at a reduced power; wherein the power reduction pattern for a particular transmission point is individual to that transmission point, and may be the same or different to a power reduction pattern for one or more other transmission points in the first cell (A).

The terminal may further comprise a receiving module for receiving information from the second cell (B) identifying which one or more transmission points of the first cell (A) are causing interference to a user equipment (UE2) connected to the second cell (B); and a power reducing module for reducing transmit power in certain subframes of the one or more transmission points determined as causing interference.

In the above the one or more determined transmission points may comprise: the strongest interfering transmission point of the first cell (A) for a user equipment of the second cell (B); or a sub-set of strongest interfering transmission points of the first cell (A) for a user equipment of the second cell (B); or one or more transmission points of the first cell (A) that cause a threshold level of interference to a user equipment of the second cell (B).

The terminal may further comprise a sending module for sending the determined two dimensional power reduction pattern to the second cell (B), for enabling the second cell (B) to determine which transmission points of the first cell (A) are transmitting at reduced power during which subframes.

The terminal may further comprise a determining module for determining which multiple channel state information, CSI, measurements are required, tied to different subframes, based on the determined power reduction pattern for transmission point(s) within the first cell (A) (step 505); a configuring module for configuring a plurality of CSI reference signal reports for different subframes with a user equipment (UE1) connected to the first cell (A) (step 507); a receiving module for receiving CSI reference signal reports from the user equipment (UE1) connected to the first cell (A) (step 509); and an identifying module that uses the received CSI reference signal reports to identify the strongest serving transmission point of the first cell (A) for the user equipment connected to the first cell (A) (step 511).

The terminal may further comprise a comparing module for comparing a plurality of CSI reference signal reports received from the user equipment (UE1) connected to the first cell (A); a determining module for determining which CSI reference signal report has the lowest channel quality indicator, CQI, value; and an identifying module for identifying a transmission point having the lowest CQI value as being the strongest serving transmission point for that user equipment (UE1).

The terminal may further comprise a determining module for determining which multiple channel state information, CSI, measurements are required, tied to different subframes, based on the determined power reduction pattern for a selected transmission point within the first cell (A) (step 607); a configuring module for configuring a plurality of CSI reference signal reports for different subframes with a user equipment (UE1) connected to the first cell (A) (step 609); a receiving module for receiving CSI reference signal reports from the user equipment (UE1) connected to the first cell (A) (step 611); and a scheduling module for scheduling the user equipment (UE1) in subframes according to the received CSI reference signal reports (step 613).

The scheduling module may be adapted, during subframes where the strongest interfering transmission point or points of the first cell (A) are transmitting at a reduced power, to schedule an user equipment in the first cell (A) whose strongest serving transmission point is not the strongest interfering transmission point or points.

The configuring module may be adapted to configure a plurality of CSI reference signal reports by: configuring non-zero power CSI reference signals, NZP CSI-RS, in a first set of configurations, and configuring CSI interference measurement, CSI-IM, in a second set of configurations in the first cell (A); and configuring CSI-IM in a third set of configurations, the third set of configurations containing the first set of configurations as a sub-set, and NZP CSI-RS in the second set of configurations in the second cell (B).

According to another aspect there is provided a terminal (for example a victim cell) for performing inter cell interference coordination between a first cell (A) and a second cell (B) of a communication network, wherein at least the first cell (A) comprises a plurality of distributed transmission points. The terminal comprises: a determining module for determining the strongest interfering transmission point or points of the first cell (A) for a user equipment (UE2) connected to the second cell (B); and a notifying module for notifying the first cell (A) of the strongest interfering transmission point or points, for enabling the first cell (A) to determine a two dimensional power reduction pattern for individually controlling the transmit power of the distributed transmission points within the first cell (A).

The terminal may further comprise a receiving module for receiving a two dimensional power reduction pattern from the first cell (A), wherein the two dimensional power reduction pattern indicates when an individual transmission point in the first cell (A) will be reducing power in certain subframes; a determining module for determining which multiple channel state information, CSI, measurements are required, tied to different subframes, based on the two dimensional power reduction pattern received from the first cell (A); a configuring module for configuring a plurality of CSI reference signal reports for different subframes with the user equipment (UE2) connected to the second cell (B); a receiving module for receiving CSI reference signal reports from the user equipment (UE2) connected to the second cell (B); and an identifying module for using the received CSI reference signal reports to identify the strongest interfering transmission point or points of the first cell (A) for the user equipment connected to the second cell (B).

The identifying module of the terminal may further comprise: a comparing module for comparing a plurality of CSI reference signal reports received from the user equipment (UE2) connected to the second cell (B); a determining module for determining which CSI reference signal report has the lowest channel quality indicator, CQI, value; and a strongest interfering transmission point identifier module for identifying a transmission point having the lowest CQI value as being the strongest interfering transmission point for that user equipment (UE2).

The strongest interfering transmission point identifier module may comprise a comparing module for comparing the power level of interfering signals received from each transmission point of the first cell (A) via the user equipment (UE2) connected to the second cell (B), wherein each interfering signal has an identifier for identifying the transmission point from which the interfering signal was transmitted; and a determining module for using the identifier to determine which one or more transmission points are causing interference to the user equipment (UE2) connected to the second cell (B).

The determining module for determining the strongest interfering transmission point or points may be adapted to performed such action once for a newly arrived user equipment into the second cell (B), or periodically with a long periodicity for a user equipment that is stationary, or has a mobility level which is below a threshold value, in the second cell (B).

When the first cell (A) comprises more than two distributed transmission points, the determining module for determining the strongest interfering transmission point or points comprises a comparing module for comparing interference from at least first and second pairs of transmission points in a series of comparison steps.

The terminal of the second cell (B) may comprise a scheduling module for scheduling a user equipment (UE2) connected to the second cell (B), and a receiving module for receiving a two dimensional power reduction pattern from the first cell (A), wherein the two dimensional power reduction pattern indicates when a selected transmission point in the first cell (A) will be reducing power in certain subframes, wherein the scheduling module schedules the user equipment (UE2) connected to the second cell (B) during subframes when a strongest interfering transmission point for that user equipment (UE2) is transmitting at reduced power.

The terminal of the second cell (B) may comprise a scheduling module for scheduling a user equipment (UE2) connected to the second cell (B); a receiving module for receiving a two dimensional power reduction pattern from the first cell (A), wherein the two dimensional power reduction pattern indicates when a selected transmission point in the first cell (A) will be reducing power in certain subframes; a determining module for determining which multiple channel state information, CSI, measurements are required, tied to different subframes, based on the two dimensional power reduction pattern received from the first cell (A); a configuring module for configuring a plurality of CSI reference signal reports for different subframes with the user equipment (UE2) connected to the second cell (B); a receiving module for receiving CSI reference signal reports from the user equipment (UE2) connected to the second cell (B); and wherein the scheduling module uses the received CSI reference signal reports to schedule the user equipment (UE2) connected to the second cell (B).

The two dimensional power reduction pattern may comprise: a two dimensional array comprising k rows and L columns wherein: each row relates to a respective transmission point of the first cell (A), or a group of respective transmission points of the first cell (A); each of the L columns relates to a set of periodic subframes of a signal being transmitted by a respective transmission point, or group of respective transmission points of the first cell (A); and an entry in the two dimensional array indicates whether a transmission point or group of transmission points of the first cell (A) has a reduced power or not.

The two dimensional power reduction pattern may comprise a two dimensional reduced power subframe, RPSF, control signal.

By individually controlling the transmitting power of distributed transmission points within a cell, performances of victim UEs can be improved, while performances of most UEs connected to the aggressor cell will not be impacted. To achieve this, embodiments of the present invention may identify the strongest interfering transmission point and the strongest serving transmission point for UEs.

The identification process may be done for each newly arrived UE just once, or with a long periodicity if the UE is stationary or has low mobility, for example, an indoor UE.

Without such an identification process, an aggressor cell has no information about which of its transmission points creates strongest interference to a victim UE. Therefore the aggressor would need to sequentially reduce transmission power of each transmission point over different subframes all the time for ICIC, which is not efficient especially when the number of the transmission points is large. With the knowledge (through X2 or central processing unit) of the strongest interfering transmission points for UEs in the victim cell, the aggressor cell can reduce the transmission power of the strongest interfering transmission point (or transmission points) and more efficiently set up the 2D RPSF pattern for ICIC.

By the same reasoning, with the knowledge of the strongest serving transmission point for UEs, better scheduling algorithms can be used by the aggressor cell when the transmit power of one transmission point in the aggressor cell is reduced. Energy saving can also be achieved if there are few UEs in the cell, and the cell only turns on the needed transmission point(s) for serving the few UEs in the system.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a first cell of a communication network, for performing inter cell interference coordination between the first cell and a second cell of the communication network, wherein at least the first cell comprises a plurality of distributed transmission points, the method comprising individually controlling the transmit power of one or more of the plurality of distributed transmission points within the first cell, wherein said individually controlling the transmit power comprises:

determining a two-dimensional power-reduction pattern indicating which subframes, if any, of each transmission point of the first cell are to be transmitted at a reduced power, the two-dimensional power-reduction pattern comprising power-reduction patterns for each of a plurality of the transmission points of the cell;

wherein the power-reduction pattern for a particular transmission point is individual to that transmission point, and may be the same as or differ from a power-reduction pattern for one or more other transmission points in the first cell.

2. The method of claim 1, wherein determining a power-reduction pattern for a selected one or more transmission points comprises:

receiving information from the second cell identifying which one or more transmission points of the first cell are causing interference to a user equipment connected to the second cell; and reducing transmit power in certain subframes of the one or more transmission points determined as causing interference.

3. The method of claim 2, wherein the one or more determined transmission points comprise:

the strongest interfering transmission point of the first cell for a user equipment of the second cell; or a sub-set of strongest interfering transmission points of the first cell for a user equipment of the second cell; or one or more transmission points of the first cell that cause a threshold level of interference to a user equipment of the second cell.

4. The method of claim 1, further comprising sending the determined two-dimensional power-reduction pattern to the second cell, for enabling the second cell to determine which transmission points of the first cell are transmitting at reduced power during which subframes.

5. The method of claim 1, further comprising:

determining which multiple channel state information (CSI) measurements are required, tied to different subframes, based on the determined power-reduction pattern for transmission points within the first cell;

configuring a plurality of CSI reference signal reports for different subframes with a user equipment connected to the first cell;

receiving CSI reference signal reports from the user equipment connected to the first cell; and using the received CSI reference signal reports to identify the strongest serving transmission point of the first cell for the user equipment connected to the first cell.

6. The method of claim 5, wherein using the received CSI reference signal reports comprises:

comparing a plurality of CSI reference signal reports received from the user equipment connected to the first cell;

determining which CSI reference signal report has the lowest channel quality indicator (CQI) value; and identifying a transmission point having the lowest CQI value as being the strongest serving transmission point for that user equipment.

7. The method of claim 1, further comprising the steps of:

determining which multiple channel state information (CSI) measurements are required, tied to different subframes, based on the determined power-reduction pattern for transmission points within the first cell;

configuring a plurality of CSI reference signal reports for different subframes with a user equipment connected to the first cell;

receiving CSI reference signal reports from the user equipment connected to the first cell; and scheduling the user equipment in subframes according to the received CSI reference signal reports.

8. The method of claim 5 wherein, during subframes where the strongest interfering transmission point or points of the first cell are transmitting at a reduced power, the first cell schedules an user equipment whose strongest serving transmission point is not the strongest interfering transmission point or points.

9. The method of claim 6, wherein configuring a plurality of CSI reference signal reports comprises:

configuring non-zero power CSI reference signals (NZP CSI-RS) in a first set of configurations, and configuring CSI interference measurement (CSI-IM) in a second set of configurations in the first cell; and configuring CSI-IM in a third set of configurations, the third set of configurations containing the first set of configurations as a sub-set, and NZP CSI-RS in the second set of configurations in the second cell.

10. The method of claim 1, wherein the two-dimensional power-reduction pattern comprises:

a two-dimensional array comprising k rows and L columns wherein:

each row relates to a respective transmission point of the first cell, or a group of respective transmission points of the first cell;

each of the L columns relates to a set of periodic subframes of a signal being transmitted by a respective transmission point, or group of respective transmission points of the first cell; and an entry in the two-dimensional array indicates whether a transmission point or group of transmission points of the first cell has a reduced power or not.

11. The method of claim 1, wherein the two-dimensional power-reduction pattern comprises a two-dimensional reduced-power subframe (RPSF) control signal.

12. The method of claim 1, wherein a two-dimensional power-reduction pattern is exchanged between a first cell and a second cell through an x2 interface of the communication network.

13. A method, in a second cell of a communication network, for performing inter cell interference coordination between a first cell of the communication network and the second cell, wherein at least the first cell comprises a plurality of distributed transmission points, the method comprising:

determining the strongest interfering transmission point or points of the first cell for a user equipment connected to the second cell; and notifying the first cell of the strongest interfering transmission point or points, for enabling the first cell to determine a two-dimensional power-reduction pattern for individually controlling the transmit power of one or more of the distributed transmission points within the first cell, the two-dimensional power-reduction pattern indicating which subframes, if any, of each transmission point of the first cell are to be transmitted at a reduced power and comprising power-reduction patterns for each of a plurality of transmission points or transmission point groups of the first cell.

14. The method of claim 13, further comprising:

receiving a two-dimensional power-reduction pattern from the first cell, wherein the two-dimensional power-reduction pattern indicates when transmission points in the first cell will be reducing power in certain subframes;

determining which multiple channel state information (CSI) measurements are required, tied to different subframes, based on the two-dimensional power-reduction pattern received from the first cell;

configuring a plurality of CSI reference signal reports for different subframes with the user equipment connected to the second cell;

receiving CSI reference signal reports from the user equipment connected to the second cell; and using the received CSI reference signal reports to identify the strongest interfering transmission point or points of the first cell for the user equipment connected to the second cell.

15. The method of claim 14, wherein using the received CSI reference signal reports comprises:

comparing a plurality of CSI reference signal reports received from the user equipment connected to the second cell;

determining which CSI reference signal report has the lowest channel quality indicator (CQI) value; and identifying a transmission point having the lowest CQI value as being the strongest interfering transmission point for that user equipment.

16. The method of claim 13, wherein determining the strongest interfering transmission point or points comprises:

comparing the power level of interfering signals received from each transmission point of the first cell via the user equipment connected to the second cell, wherein each interfering signal has an identifier for identifying the transmission point from which the interfering signal was transmitted; and using the identifier to determine which one or more transmission points are causing interference to the user equipment connected to the second cell.

17. The method of claim 13, wherein determining the strongest interfering transmission point or points is performed once for a newly arrived user equipment into the second cell, or periodically with a long periodicity for a user equipment that is stationary or has a mobility level which is below a threshold value, in the second cell.

18. The method of claim 13, wherein the first cell comprises more than two distributed transmission points, and wherein determining the strongest interfering transmission point or points comprises comparing interference from at least first and second pairs of transmission points in a series of comparison steps.

19. The method of claim 13, wherein the second cell schedules a user equipment connected to the second cell by:

receiving a two-dimensional power-reduction pattern from the first cell, wherein the two-dimensional power-reduction pattern indicates when transmission points in the first cell will be reducing power in certain subframes; and scheduling the user equipment connected to the second cell during subframes when a strongest interfering transmission point for that user equipment is transmitting at reduced power.

20. The method of claim 13, wherein the second cell schedules a user equipment connected to the second cell by:

receiving a two-dimensional power-reduction pattern from the first cell, wherein the two-dimensional power-reduction pattern indicates when transmission points in the first cell will be reducing power in certain subframes;

determining which multiple channel state information (CSI) measurements are required, tied to different subframes, based on the two-dimensional power-reduction pattern received from the first cell;

configuring a plurality of CSI reference signal reports for different subframes with the user equipment connected to the second cell;

receiving CSI reference signal reports from the user equipment connected to the second cell; and using the received CSI reference signal reports to schedule the user equipment connected to the second cell.

21. The method of claim 13, wherein the two-dimensional power-reduction pattern comprises:
   a two-dimensional array comprising k rows and L columns wherein:
   each row relates to a respective transmission point of the first cell, or a group of respective transmission points of the first cell;
   each of the L columns relates to a set of periodic subframes of a signal being transmitted by a respective transmission point, or group of respective transmission points of the first cell; and
   an entry in the two-dimensional array indicates whether or not a transmission point or group of transmission points of the first cell has a reduced power.

22. The method of claim 13, wherein the two-dimensional power-reduction pattern comprises a two-dimensional reduced-power subframe (RPSF) control signal.

23. The method of claim 13, wherein a two-dimensional power-reduction pattern is exchanged between a first cell and a second cell through an x2 interface of the communication network.

24. A user terminal for use in a communication network comprising a first cell and a second cell, wherein at least the first cell comprises a plurality of distributed transmission points, wherein the user terminal comprises:
   a receiving module; and
   a processing circuit adapted to, when connected to the second cell, receive a downlink signal during subframes in which the strongest interfering transmission point of the first cell is transmitting at reduced power according to a two-dimensional power-reduction pattern indicating which subframes, if any, of each transmission point of the first cell are to be transmitted at a reduced power, the two-dimensional power-reduction pattern comprising power-reduction patterns for each of a plurality of transmission points or transmission point groups of the first cell.

25. The user terminal of claim 24, wherein the processing circuit comprises a processor and a memory, wherein said memory contains instructions executable by said processor.

26. A control node for performing inter cell interference coordination between a first cell and a second cell of a communication network, wherein at least the first cell comprises a plurality of distributed transmission points, the control node comprising a processing circuit adapted to individually control the transmit power of one or more of the plurality of distributed transmission points within the first cell according to a two-dimensional power-reduction pattern indicating which subframes, if any, of each transmission point of the first cell are to be transmitted at a reduced power, the two-dimensional power-reduction pattern comprising power-reduction patterns for each of a plurality of transmission points or transmission point groups of the first cell.

27. The control node of claim 26, wherein the processing circuit comprises a processor and a memory, wherein said memory contains instructions executable by said processor, and stores the two-dimensional power-reduction pattern.

28. A control node for performing inter cell interference coordination between a first cell and a second cell of a communication network, wherein at least the first cell comprises a plurality of distributed transmission points, the control node comprising:
   a processing circuit adapted to determine the strongest interfering transmission point or points of the first cell for a user equipment connected to the second cell; and
   a transmitter circuit adapted to notify the first cell of the strongest interfering transmission point or points, for enabling the first cell to determine a two-dimensional power-reduction pattern for individually controlling the transmit power of one or more of the distributed transmission points within the first cell, the two-dimensional power-reduction pattern indicating which subframes, if any, of each transmission point of the first cell are to be transmitted at a reduced power and comprising power-reduction patterns for each of a plurality of transmission points or transmission point groups of the first cell.

29. The control node as claimed in claim 28, wherein the processing circuit comprises a processor and a memory, wherein said memory contains instructions executable by said processor.

* * * * *